US010651999B2

(12) United States Patent
Gao et al.

(10) Patent No.: US 10,651,999 B2
(45) Date of Patent: May 12, 2020

(54) TRANSMISSION METHOD, DEVICE AND SYSTEM

(71) Applicant: CHINA ACADEMY OF TELECOMMUNICATIONS TECHNOLOGY, Beijing (CN)

(72) Inventors: Xuejuan Gao, Beijing (CN); Xueming Pan, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 16/090,577

(22) PCT Filed: Jan. 13, 2017

(86) PCT No.: PCT/CN2017/071042
§ 371 (c)(1),
(2) Date: Oct. 1, 2018

(87) PCT Pub. No.: WO2017/166902
PCT Pub. Date: Oct. 5, 2017

(65) Prior Publication Data
US 2019/0349167 A1 Nov. 14, 2019

(30) Foreign Application Priority Data
Mar. 31, 2016 (CN) .......................... 2016 1 0197212

(51) Int. Cl.
*H04L 5/00* (2006.01)
*H04W 72/04* (2009.01)
(Continued)

(52) U.S. Cl.
CPC ......... *H04L 5/0051* (2013.01); *H04W 72/042* (2013.01); *H04W 72/0453* (2013.01); *H04W 72/1268* (2013.01); *H04W 72/14* (2013.01)

(58) Field of Classification Search
CPC .... H04L 5/0048–0051; H04W 72/042; H04W 72/0453; H04W 72/1268
See application file for complete search history.

(56) References Cited

U.S. PATENT DOCUMENTS

2010/0149962 A1 6/2010 Yun-Ok et al.
2011/0128909 A1* 6/2011 Luo ....................... H04L 5/0023
                                                                370/328
2018/0254869 A1 9/2018 Li et al.

FOREIGN PATENT DOCUMENTS

CN       101005340 A    7/2007
CN       101047480 A    10/2007
(Continued)

OTHER PUBLICATIONS

First Office Action and Search Report from CN app. No. 201610197212.2, dated May 24, 2019, with English translation from Global Dossier.
(Continued)

*Primary Examiner* — Pao Sinkantarakorn
(74) *Attorney, Agent, or Firm* — Ladas & Parry, LLP

(57) ABSTRACT

Various embodiments of the present disclosure provide a transmission method, device, and system. The transmission method includes: receiving, by a terminal, a first downlink control channel, determining a first frequency domain resource according to the first downlink control channel, and transmitting a first uplink shared channel on the first frequency domain resource; determining, by the terminal, a sequence length of a pilot of the terminal according to a size of the first frequency domain resource and a mapping interval or a density or a pilot multiplexing factor of each element in a pilot sequence on a frequency domain, and generating the pilot sequence with the sequence length; and determining, by the terminal, a frequency domain starting position of the pilot sequence on the first frequency domain (Continued)

resource, mapping the pilot sequence on the first frequency domain resource for transmitting according to the frequency domain starting position and the mapping interval or the density or the pilot multiplexing factor.

16 Claims, 10 Drawing Sheets

(51) Int. Cl.
*H04W 72/12* (2009.01)
*H04W 72/14* (2009.01)

(56) References Cited

FOREIGN PATENT DOCUMENTS

| | | |
|---|---|---|
| CN | 101132544 A | 2/2008 |
| CN | 104009827 A | 8/2014 |
| CN | 104009831 A | 8/2014 |
| WO | 2017075807 A1 | 5/2017 |

OTHER PUBLICATIONS

Extended European Search Report from EP app. No. 17772933.2, dated Mar. 14, 2019.
"Discussion on PUSCH transmission with TTI shortening", 3GPP TSG RAN WG1 Meeting #84, R1-160655, St. Julian's, Malta, Feb. 15-19, 2016.
"Uplink Reference Signal Design for Short TTI", 3GPP TSG RAN WG1 Meeting #84, R1-160864, St. Julian's Malta, Feb. 15-19, 2016.
"Link level evaluation of PUSCH for short TTI", 3GPP TSG RAN WG1 Meeting #84, R1-160940, Malta, Feb. 15-19, 2016.
"UL aspects of TTI shortening". 3GPP TSG RAN WG1 Meeting #84, R1-160965, St. Julian's, Malta, Feb. 15-19, 2016.
"Uplink DMRS for PUSCH in short TTI", 3GPP TSG RAN WG1 Meeting #84, R1-160987, St. Julian's, Malta, Feb. 15-19, 2016.
Ogawa et al, "Pilot Signal Generation Scheme using Frequency Dependent Cyclic Shift Sequence for Inter-cell Interference Mitigation", Radio and Wireless Symposium, 2009, Jan. 18, 2009, pp. 421-424.
International Preliminary Report on Patentability from PCT/CN2017/071042, dated Oct. 2, 2018, with English translation from WIPO.
Written Opinion of the International Search Authority for PCT/CN2017/071042 dated Mar. 27, 2017 and its English translation provided by WIPO.
International Search Report for PCT/CN2017/071042 dated Mar. 27, 2017 and its English translation provided by WIPO.
Written Opinion of the International Search Authority PCT/CN2017/071042 dated Mar. 27, 2017 and its English translation provided by Google Translate.
Notice of Reasons for Refusal from JP app. No. 2018-551380, dated Aug. 6, 2019, with English translation from Global Dossier.
"Physical layer aspects of short TTI for uplink transmissions", R1-157149, 3GPP TSG RAN WG1 Meeting #83, Anaheim, USA, Nov. 15-22, 2018.
"DCI bit fields for short TTI uplink transmissions", R1-160941, 3GPP TSG RAN WG1 Meeting #84, Malta, Feb. 15-19, 2016.
"Design of sPUSCH for shortened TTI", R1-162299, Busan, Korea, Apr. 11-15, 2016.

\* cited by examiner

--Prior art--

--Prior art--

--Prior art--

--Prior art--

--Prior art--

TRANSMISSION METHOD, DEVICE AND SYSTEM

CROSS-REFERENCE TO RELATED APPLICATIONS

This application is the U.S. national phase of PCT Application PCT/CN2017/071042 filed on Jan. 13, 2017 which claims the benefit of and priority to Chinese Patent Application No. 201610197212.2, filed on Mar. 31, 2016, the disclosures of which are incorporated herein by reference in their entireties.

TECHNICAL FIELD

The present disclosure relates to the field of communication technologies, and in particular, to a transmission method, device, and system.

BACKGROUND

FIG. 1 is a schematic diagram illustrating structure of frame structure type 1 (referred to as FS1) used in a Long Term Evolution (LTE) Frequency Division Duplexing (FDD) system in related art. In the FDD system, uplink and downlink transmissions use different carrier frequencies. The uplink and downlink transmissions use the same frame structure. On each carrier, one radio frame of which the length is 10 ms contains ten subframes, and the length of each subframe is 1 ms. Each subframe contains two timeslots, and the length of each timeslot is 0.5 ms. A Transmission Time Interval (TTI) of uplink and downlink data transmission is 1 ms.

FIG. 2 is a schematic diagram illustrating structure of frame structure type 2 (referred to as FS2) used in a LTE Time Division Duplex (TDD) system in the related art. In the TDD system, uplink and downlink transmissions use different subframes or different timeslots on the same frequency. In FS2, each radio frame of which the length is 10 ms consists of two half-frames, and the length of each half-frame is 5 ms. Each half-frame contains five subframes, and the length of each subframe is 1 ms. Subframes in FS2 are classified into three types, i.e., a downlink subframe, an uplink subframe, and a special subframe. Each special subframe consists of three parts, i.e., Downlink Pilot Time Slot (DwPTS), Guard Period (GP), and Uplink Pilot Time Slot (UpPTS). The DwPTS may transmit downlink pilot, downlink service data, and downlink control signaling. The GP does not transmit any signal. The UpPTS transmits random access and Sounding Reference Symbol (SRS), and does not transmit uplink service or uplink control information. Each half-frame includes at least one downlink subframe, at least one uplink subframe, and at most one special subframe. Table 1 illustrates seven kinds of uplink-downlink subframe configurations supported by FS2.

TABLE 1

| Uplink-downlink configurations | | | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |

TABLE 1-continued

| Uplink-downlink configurations | | | | | | | | | | | |
|---|---|---|---|---|---|---|---|---|---|---|---|
| Uplink-downlink configuration | Downlink-to-Uplink Switch-point periodicity | Subframe number | | | | | | | | | |
| | | 0 | 1 | 2 | 3 | 4 | 5 | 6 | 7 | 8 | 9 |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIGS. 3A and 3B illustrate structures of data and pilot (i.e., a reference symbols, or a DeModulation Reference Signal (DMRS) for data demodulation) of a LTE Physical Uplink Shared Control Channel (PUSCH) in one subframe. Referring to FIG. 3A, under a conventional Cyclic Prefix (CP), the fourth symbol in each timeslot in each subframe transmits the pilot, and remaining symbols transmit data. Referring to FIG. 3B, under an extended CP, the third symbol in each timeslot in each subframe transmits the pilot, and remaining symbols transmit data. An uplink pilot is a terminal-specific pilot, which is generated according to actual bandwidth size scheduled by the PUSCH. In order to support uplink Multi-User Multiple-Input Multiple-Output (MU-MIMO), each column of pilots may implement orthogonal transmission of pilots of multiple terminals which share the same resources by cyclically shifting the same pilot base sequence. As such, a receiving end may distinguish pilot information of different terminals through cyclic shift.

In a LTE system, channel transmission in the related art is defined in a unit of subframe, and there is not a TTI transmission mechanism which is shorter than 1 ms. Therefore, it is necessary to propose a new DMRS transmission mode to ensure that when multiple TTIs share a DMRS time domain position, the TTIs do not interfere with each other.

SUMMARY

In view of the above technical problems, the present disclosure provides a transmission method, device, and system that solve the problem of mutual interference when multiple TTIs share a DMRS time domain position.

Various embodiments of the present disclosure provide a transmission method, including:

receiving, by a terminal, a first downlink control channel, determining a first frequency domain resource according to the first downlink control channel, and transmitting a first uplink shared channel on the first frequency domain resource;

determining, by the terminal, a sequence length of a pilot of the terminal according to a size of the first frequency domain resource and a mapping interval or a density or a pilot multiplexing factor of each element in a pilot sequence on a frequency domain, and generating the pilot sequence with the sequence length; and determining, by the terminal, a frequency domain starting position of the pilot sequence on the first frequency domain resource, mapping the pilot sequence on the first frequency domain resource for transmitting according to the frequency domain starting position and the mapping interval or the density or the pilot multiplexing factor.

Optionally, the first downlink control channel carries an uplink scheduling grant of the first uplink shared channel; and/or, a Transmission Time Interval (TTI) length of the first downlink control channel and/or the first uplink shared channel is less than or equal to 1 ms.

Optionally, the sequence length of the pilot is equal to (the number of subcarriers included in the first frequency domain resource)/K, wherein K is the mapping interval, or the density, or the pilot multiplexing factor.

Optionally, the mapping interval or the density or the pilot multiplexing factor is pre-determined or informed through configuration signaling, wherein the configuration signaling is high-level signaling or an indication field in the first downlink control channel.

Optionally, the mapping interval or the density or the pilot multiplexing factor is a divisor of the number of subcarriers included in a basic unit of frequency domain transmission, wherein the basic unit of the frequency domain transmission is pre-defined as M Physical Resource Blocks (PRB) or subcarriers or resource units in the frequency domain, wherein M is a pre-defined or pre-configured positive integer not less than 1, and the resource unit is defined as a subcarrier on a symbol or consecutive X2 subcarriers in the frequency domain on a symbol.

Optionally, the frequency domain starting position $k_{TC}$ belongs to a set $\{0, 1, \ldots, K-1\}$ or $\{1, 2, \ldots, K\}$ including K different frequency domain starting position elements, wherein K is a value of the mapping interval or the density or the pilot multiplexing factor.

Optionally, the method further includes: determining the frequency domain starting position according to a pre-determined rule or determining the frequency domain starting position according to a configuration signaling.

Optionally, wherein the determining the frequency domain starting position according to the pre-determined rule includes:

predetermining a correspondence between each basic TTI divided based on a basic TTI length in a subframe and a frequency domain starting position of pilot transmission of each basic TTI, wherein the basic TTI length is a minimum TTI length allowed for once data transmission, every data transmission occupies an integer multiple of the basic TTI and does not exceed a boundary of a subframe; when a data transmission occupies more than one basic TTI length, determining that a frequency domain starting position of a pilot of the data transmission is a frequency domain starting position of pilot transmission corresponding to one basic TTI of a basic TTI set occupied by the data transmission; wherein the determining the frequency domain starting position according to the configuration signaling includes: higher layer signaling pre-configuring the frequency domain starting position, or the first downlink control channel notifying the frequency domain starting position.

Optionally, frequency domain starting positions corresponding to multiple first uplink shared channels transmitting the pilot on the same frequency domain resource on the same symbol are different; or, the frequency domain starting positions corresponding to the multiple first uplink shared channels transmitting the pilot on the same frequency domain resource on the same symbol are identical, and pilot cyclic shifts or pilot orthogonality sequences corresponding to the multiple first uplink shared channels are different; or, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and pilot cyclic shifts or pilot orthogonality sequences corresponding to the remaining part of the multiple first uplink shared channels are different.

Optionally, the size of the first frequency domain resource is an integer multiple of a basic unit of frequency domain transmission; and/or, the first frequency domain resource is indicated taking the basic unit of the frequency domain transmission as a unit.

Various embodiments of the present disclosure provide a transmission method, including: determining, by a base station, a first frequency domain resource used by a terminal to transmit a first uplink shared channel, and sending a first downlink control channel to the terminal to notify the first frequency domain resource; receiving, by the base station on the first frequency domain resource, the first uplink shared channel sent by the terminal; determining, by the base station, a sequence length of a pilot of the terminal based on a size of the first frequency domain resource and a mapping interval or a density or a pilot multiplexing factor of each element in a pilot sequence of the terminal on a frequency domain; and determining, by the base station, a frequency domain starting position of the pilot sequence of the terminal on the first frequency domain resource, and receiving, according to the frequency domain starting position and the mapping interval or the density or the pilot multiplexing factor, the pilot sequence sent from the terminal on the first frequency domain resource.

Optionally, the first downlink control channel carries an uplink scheduling grant of the first uplink shared channel; and/or, a transmission Time Interval (TTI) length of the first downlink control channel and/or the first uplink shared channel is less than or equal to 1 ms.

Optionally, the sequence length of the pilot is equal to (the number of subcarriers included in the first frequency domain resource)/K, wherein K is the mapping interval, or the density, or the pilot multiplexing factor.

Optionally, the mapping interval or the density or the pilot multiplexing factor is pre-determined or informed through configuration signaling, wherein the configuration signaling is high-level signaling or an indication field in the first downlink control channel.

Optionally, the mapping interval or the density or the pilot multiplexing factor is a divisor of the number of subcarriers included in a basic unit of frequency domain transmission, wherein the basic unit of the frequency domain transmission is pre-defined as M Physical Resource Blocks (PRB) or subcarriers or resource units in the frequency domain, wherein M is a pre-defined or pre-configured positive integer not less than 1, and the resource unit is defined as a subcarrier on a symbol or consecutive X2 subcarriers in the frequency domain on a symbol.

Optionally, the frequency domain starting position $k_{TC}$ belongs to a set $\{0, 1, \ldots, K-1\}$ or $\{1, 2, \ldots, K\}$ including K different frequency domain starting position elements, wherein K is a value of the mapping interval or the density or the pilot multiplexing factor.

Optionally, the method further includes: determining the frequency domain starting position according to a pre-determined rule or determining the frequency domain starting position according to a configuration signaling.

Optionally, the determining the frequency domain starting position according to the pre-determined rule includes: predetermining a correspondence between each basic TTI divided based on a basic TTI length in a subframe and a frequency domain starting position of pilot transmission of each basic TTI, wherein the basic TTI length is a minimum TTI length allowed for once data transmission, every data transmission occupies an integer multiple of the basic TTI and does not exceed a boundary of a subframe; when a data transmission occupies more than one basic TTI length, determining that a frequency domain starting position of a pilot of the data transmission is a frequency domain starting position of pilot transmission corresponding to one basic TTI of a basic TTI set occupied by the data transmission; wherein the determining the frequency domain starting position according to the configuration signaling includes: higher layer signaling pre-configuring the frequency domain starting position, or the first downlink control channel notifying the frequency domain starting position.

Optionally, frequency domain starting positions corresponding to multiple first uplink shared channels transmitting the pilot on the same frequency domain resource on the same symbol are different; or, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different; or, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

Optionally, the size of the first frequency domain resource is an integer multiple of a basic unit of frequency domain transmission; and/or, the first frequency domain resource is indicated taking the basic unit of the frequency domain transmission as a unit.

Various embodiments of the present disclosure provide a terminal, including: a first receiving module, configured to receive a first downlink control channel, determine a first frequency domain resource according to the first downlink control channel, and transmit a first uplink shared channel on the first frequency domain resource; a first determining module, configured to determine a sequence length of a pilot of the terminal according to a size of the first frequency domain resource and a mapping interval or a density or a pilot multiplexing factor of each element in a pilot sequence on a frequency domain, and generate the pilot sequence with the sequence length; and a transmitting module, configured to determine a frequency domain starting position of the pilot sequence on the first frequency domain resource, map the pilot sequence on the first frequency domain resource for transmitting according to the frequency domain starting position and the mapping interval or the density or the pilot multiplexing factor.

Optionally, the first downlink control channel carries an uplink scheduling grant of the first uplink shared channel; and/or, a Transmission Time Interval (TTI) length of the first downlink control channel and/or the first uplink shared channel is less than or equal to 1 ms.

Optionally, the sequence length of the pilot is equal to (the number of subcarriers included in the first frequency domain resource)/K, wherein K is the mapping interval, or the density, or the pilot multiplexing factor.

Optionally, the mapping interval or the density or the pilot multiplexing factor is pre-determined or informed through configuration signaling, wherein the configuration signaling is high-level signaling or an indication field in the first downlink control channel.

Optionally, the mapping interval or the density or the pilot multiplexing factor is a divisor of the number of subcarriers included in a basic unit of frequency domain transmission, wherein the basic unit of the frequency domain transmission is pre-defined as M Physical Resource Blocks (PRB) or subcarriers or resource units in the frequency domain, wherein M is a pre-defined or pre-configured positive integer not less than 1, and the resource unit is defined as a subcarrier on a symbol or consecutive X2 subcarriers in the frequency domain on a symbol.

Optionally, the frequency domain starting position $k_{TC}$ belongs to a set $\{0, 1, \ldots, K-1\}$ or $\{1, 2, \ldots, K\}$ including K different frequency domain starting position elements, wherein K is a value of the mapping interval or the density or the pilot multiplexing factor.

Optionally, the frequency domain starting position is determined according to a pre-determined rule or is notified through configuration signaling.

Optionally, wherein the frequency domain starting position is determined according to the pre-determined rule in a way that includes: predetermining a correspondence between each basic TTI divided based on a basic TTI length in a subframe and a frequency domain starting position of pilot transmission of each basic TTI, wherein the basic TTI length is a minimum TTI length allowed for once data transmission, every data transmission occupies an integer multiple of the basic TTI and does not exceed a boundary of a subframe; when a data transmission occupies more than one basic TTI length, determining that a frequency domain starting position of a pilot of the data transmission is a frequency domain starting position of pilot transmission corresponding to one basic TTI of a basic TTI set occupied by the data transmission; wherein the determining the frequency domain starting position according to the configuration signaling includes: higher layer signaling pre-configuring the frequency domain starting position, or the first downlink control channel notifying the frequency domain starting position.

Optionally, frequency domain starting positions corresponding to multiple first uplink shared channels transmitting the pilot on the same frequency domain resource on the same symbol are different; or, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different; or, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

Optionally, the size of the first frequency domain resource is an integer multiple of a basic unit of frequency domain transmission; and/or, the first frequency domain resource is indicated taking the basic unit of the frequency domain transmission as a unit.

Various embodiments of the present disclosure provide a terminal, including: a first transceiver, configured to receive a first downlink control channel, determine a first frequency domain resource according to the first downlink control channel, transmit a first uplink shared channel on the first frequency domain resource, and map a pilot sequence on the first frequency domain resource for transmitting according to a frequency domain starting position and a mapping interval or a density or a pilot multiplexing factor; and a first processor, configured to determine a sequence length of a pilot of the terminal according to a size of the first frequency domain resource and a mapping interval or a density or a pilot multiplexing factor of each element in the pilot sequence on a frequency domain, generate the pilot sequence with the sequence length, and determine a frequency domain starting position of the pilot sequence on the first frequency domain resource.

Various embodiments of the present disclosure provide a base station, including: a sending module, configured to determine a first frequency domain resource used by a terminal to transmit a first uplink shared channel, and send a first downlink control channel to the terminal to notify the first frequency domain resource; a second receiving module, configured to receive, on the first frequency domain resource, the first uplink shared channel sent by the terminal; a second determining module, configured to determine a sequence length of a pilot of the terminal based on a size of the first frequency domain resource and a mapping interval or a density or a pilot multiplexing factor of each element in a pilot sequence of the terminal on a frequency domain; and a third receiving module, configured to determine a frequency domain starting position of the pilot sequence of the terminal on the first frequency domain resource, and receive, according to the frequency domain starting position and the mapping interval or the density or the pilot multiplexing factor, the pilot sequence sent from the terminal on the first frequency domain resource.

Optionally, the first downlink control channel carries an uplink scheduling grant of the first uplink shared channel; and/or, a Transmission Time Interval (TTI) length of the first downlink control channel and/or the first uplink shared channel is less than or equal to 1 ms.

Optionally, the sequence length of the pilot is equal to (the number of subcarriers included in the first frequency domain resource)/K, wherein K is the mapping interval, or the density, or the pilot multiplexing factor.

Optionally, the mapping interval or the density or the pilot multiplexing factor is pre-determined or informed through configuration signaling, wherein the configuration signaling is high-level signaling or an indication field in the first downlink control channel.

Optionally, the mapping interval or the density or the pilot multiplexing factor is a divisor of the number of subcarriers included in a basic unit of frequency domain transmission, wherein the basic unit of the frequency domain transmission is pre-defined as M Physical Resource Blocks (PRB) or subcarriers or resource units in the frequency domain, wherein M is a pre-defined or pre-configured positive integer not less than 1, and the resource unit is defined as a subcarrier on a symbol or consecutive X2 subcarriers in the frequency domain on a symbol.

Optionally, the frequency domain starting position $k_{TC}$ belongs to a set $\{0, 1, \ldots, K-1\}$ or $\{1, 2, \ldots, K\}$ including K different frequency domain starting position elements, wherein K is a value of the mapping interval or the density or the pilot multiplexing factor.

Optionally, the frequency domain starting position is determined according to a pre-determined rule or is notified through configuration signaling.

Optionally, the frequency domain starting position is determined according to the pre-determined rule in a way that includes: predetermining a correspondence between each basic TTI divided based on a basic TTI length in a subframe and a frequency domain starting position of pilot transmission of each basic TTI, wherein the basic TTI length is a minimum TTI length allowed for once data transmission, every data transmission occupies an integer multiple of the basic TTI and does not exceed a boundary of a subframe; when a data transmission occupies more than one basic TTI length, determining that a frequency domain starting position of a pilot of the data transmission is a frequency domain starting position of pilot transmission corresponding to one basic TTI of a basic TTI set occupied by the data transmission; wherein the determining the frequency domain starting position according to the configuration signaling includes: higher layer signaling pre-configuring the frequency domain starting position, or the first downlink control channel notifying the frequency domain starting position Optionally, frequency domain starting positions corresponding to multiple first uplink shared channels transmitting the pilot on the same frequency domain resource on the same symbol are different; or, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different; or, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and p cyclic shifts of the pilot or orthogonality sequences of the pilot corresponding to the remaining part of the multiple first uplink shared channels are different.

Optionally, the size of the first frequency domain resource is an integer multiple of a basic unit of frequency domain transmission; and/or, the first frequency domain resource is indicated taking the basic unit of the frequency domain transmission as a unit.

Various embodiments of the present disclosure provide a base station, including: a second transceiver, configured to send a first downlink control channel to a terminal to notify a first frequency domain resource, receive, on the first frequency domain resource, a first uplink shared channel sent by the terminal, and receive, according to a frequency domain starting position and a mapping interval or a density or a pilot multiplexing factor, a pilot sequence sent from the terminal on the first frequency domain resource; and a second processor, configured to determine the first frequency domain resource used by the terminal to transmit the first uplink shared channel, determine a sequence length of a pilot of the terminal based on a size of the first frequency domain resource and a mapping interval or a density or a pilot multiplexing factor of each element in the pilot sequence of the terminal on a frequency domain, and determine a frequency domain starting position of the pilot sequence of the terminal on the first frequency domain resource.

Various embodiments of the present disclosure provide a transmission system including a terminal and a base station; wherein the terminal is configured to receive a first downlink control channel, determine a first frequency domain resource according to the first downlink control channel, and transmit a first uplink shared channel on the first frequency domain resource; the terminal is further configured to determine a sequence length of a pilot of the terminal according to a size of the first frequency domain resource and a mapping interval or a density or a pilot multiplexing factor of each element in a pilot sequence on a frequency domain, and generate the pilot sequence with the sequence length; the terminal is further configured to determine a frequency domain starting position of the pilot sequence on the first frequency domain resource, map the pilot sequence on the first frequency domain resource for transmitting according to the frequency domain starting position and the mapping interval or the density or the pilot multiplexing factor, the base station is configured to determine a first frequency domain resource used by a terminal to transmit a first uplink shared channel, and send a first downlink control channel to the terminal to notify the first frequency domain resource; the base station is further configured to receive, on the first frequency domain resource, the first uplink shared channel sent by the terminal; the base station is further configured to determine a sequence length of a pilot of the terminal based on a size of the first frequency domain resource and a mapping interval or a density or a pilot multiplexing factor of each element in a pilot sequence of the terminal on a frequency domain; the base station is further configured to determine a frequency domain starting position of the pilot sequence of the terminal on the first frequency domain resource, and receive, according to the frequency domain starting position and the mapping interval or the density or the pilot multiplexing factor, the pilot sequence sent from the terminal on the first frequency domain resource.

According to various embodiments of the present disclosure, when different TTIs share the same symbol position for transmitting the DMRS, the different TTIs adopt combo structure on the same DMRS symbol position to occupy different subcarriers for transmitting the DMRS of each of the TTIs. The DMRS of each of the TTIs is transmitted according to scheduled frequency domain resources, thus the DMRSs of the different TTIs are transmitted on the same symbol by frequency division multiplexing. As such, frequency division multiplexing transmission of pilot sequences of multiple data transmissions in the same resource area may be achieved through the comb structure. Thus, when the transmission bandwidth changes, it is ensured that frequency domain resources of the data transmission are different but DMRSs of multiple terminals sharing DMRS resources may be distinguished. In this way, uplink data may be correctly transmitted and demodulated. And, when multiple TTIs share a DMRS time domain position, the TTIs do not interfere with each other.

BRIEF DESCRIPTION OF THE DRAWINGS

In order to more clearly illustrate technical solutions of embodiments of the present disclosure, the figures which are needed to be used in the description of the embodiments will be briefly described in the following. Obviously, the figures in the following description are some embodiments of the present disclosure, and it is easily for those skilled in the art to obtain other figures based on the following figures without creative efforts. The following figures are not scaled in actual dimensions, of which the emphasis is on the subject matter of the present disclosure.

DETAILED DESCRIPTION

Hereinafter, technical solutions in embodiments of the present disclosure will be clearly and completely described with reference to the accompanying drawings. It is obvious that the described embodiments are a part of the embodiments of the present disclosure, and not all embodiments. All other embodiments obtained by a person skilled in the art based on the embodiments of the present disclosure without creative efforts belong to the protection scope of the present disclosure.

Figure 1:
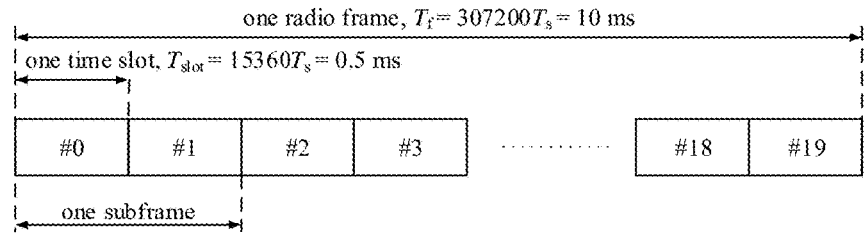
FIG. 1 is a schematic diagram illustrating frame structure used in a LTE FDD system in related art.
Figure 2:
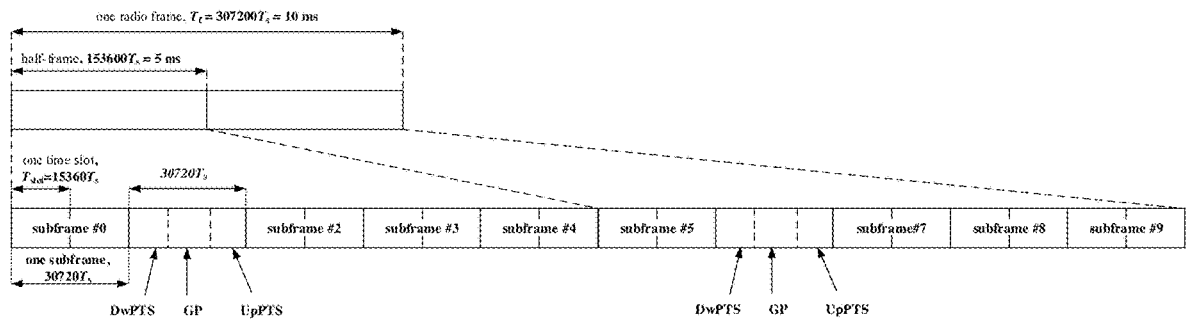
FIG. 2 is a schematic diagram illustrating frame structure used in a LTE TDD system in related art.
Figure 3A:
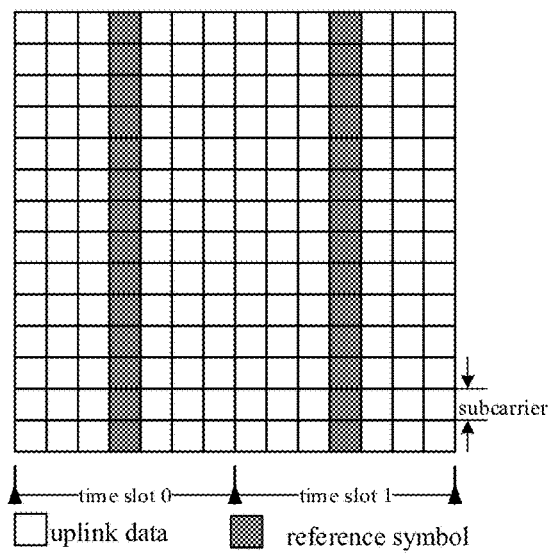
FIG. 3A is a schematic diagram illustrating structures of data and pilot in one subframe under a conventional CP in related art.
Figure 3B:
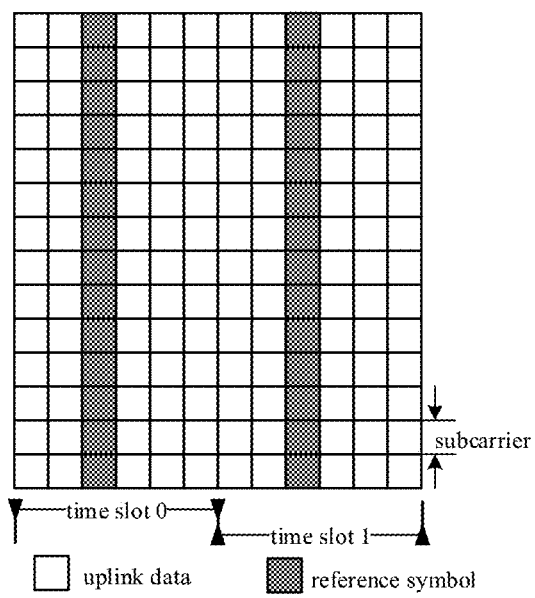
FIG. 3B is a schematic diagram illustrating structures of data and pilot in one subframe under an extended CP in related art.
Figure 4:
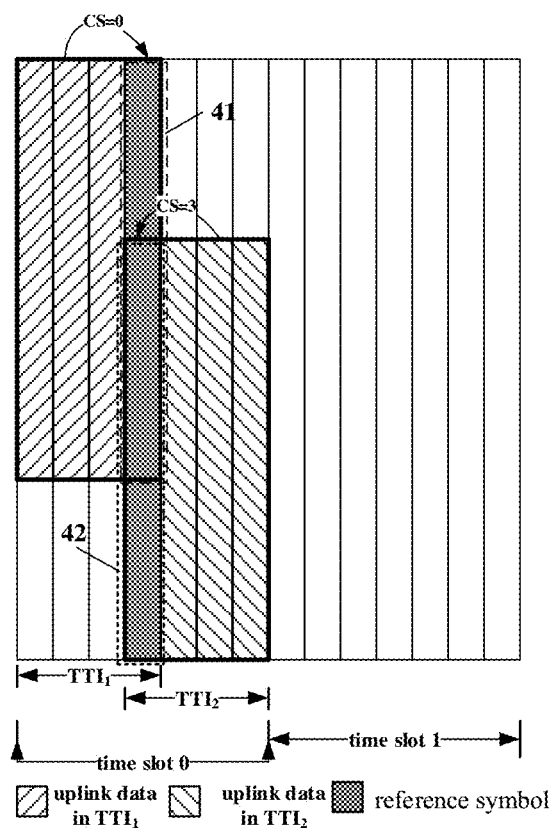
FIG. 4 is a schematic diagram illustrating overlapping on some frequency domain resources in the related art.

In a LTE system, channel transmission in the related art is defined in a unit of subframe, and there is not a TTI transmission mechanism which is shorter than 1 ms. When a PUSCH is transmitted with a TTI length shorter than 1 ms, the DMRS structure designed for a subframe of which the length is 1 ms in the LTE system may be reused in a simple manner, i.e., a DMRS transmission symbol position defined for a subframe in the LTE system is not changed, the DMRS symbol position in the LTE system may be shared by multiple PUSCHs which are in the same subframe and transmitted using a TTI length shorter than 1 ms. However, the multiple PUSCHs have independent scheduling information, and scheduling bandwidth of the multiple PUSCHs may be partially overlapped. As such, when based on the definition of the mechanism in the related art, a DMRS sequence of each PUSCH is generated according to scheduling bandwidth and corresponding DMRS Cyclic Shift (CS) of the PUSCH. When mapping to the same symbol, DMRS sequences are not aligned because the scheduling bandwidth is partially overlapped. As such, orthogonality between DMRS sequences corresponding to different PUSCHs mapped on the same frequency domain resources may be destroyed. That is, as shown in FIG. 4, the DMRS corresponding to TTI1 and transmitted in dashed box 41 is overlapped with the DMRS corresponding to TTI2 and transmitted in dashed box 42 on some frequency domain resources, which destroys the orthogonality of the DMRS, and thus a base station may not distinguish the DMRS of TTI1 from the DMRS of TTI2.

Embodiments of the present disclosure provide a transmission method, device, and system. When different TTIs share the same symbol position for transmitting the DMRS, the different TTIs adopt combo structure on the same DMRS symbol position to occupy different subcarriers for transmitting the DMRS of each of the TTIs. The DMRS of each of the TTIs is transmitted according to scheduled frequency domain resources, thus the DMRSs of the different TTIs are transmitted on the same symbol by frequency division multiplexing.

Exemplary embodiments of the present disclosure will be described in detail below with reference to the accompanying drawings. The exemplary embodiments of the present disclosure are shown in the drawings. It should be understood that the present disclosure may be implemented in various embodiments and should not be limited by the embodiments set forth herein. Rather, the exemplary embodiments set forth herein are provided so that the present disclosure will be fully understood, and the scope of the present disclosure may be fully disclosed to those skilled in the art.

Figure 5:
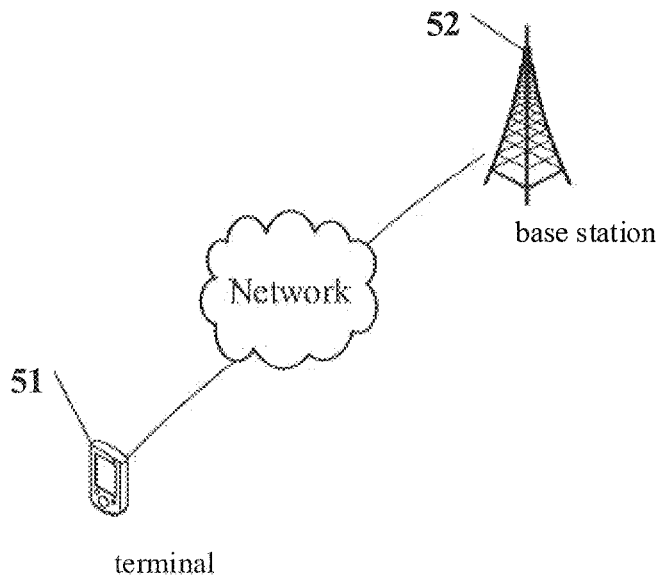
FIG. 5 is a schematic diagram illustrating network structure according to an embodiment of the present disclosure.

Referring to FIG. 5, FIG. 5 is a schematic diagram illustrating network structure according to an embodiment of the present disclosure. As shown in FIG. 5, a terminal 51 and a base station 52 are included. In an embodiment of the present disclosure, the terminal 51 (User Equipment, UE) may be a mobile phone, or other devices capable of transmitting or receiving wireless signals, including a user device (terminal), a Personal Digital Assistant (PDA), a wireless modem, a wireless communication device, a handheld device, a laptop computer, a cordless phone, a Wireless Local Loop (WLL) station, a Customer Premise Equipment (CPE) which converts mobile signals into WiFi signals, a mobile smart hotspot, a smart home appliance, or other devices that may spontaneously communicate with a mobile communication network without operations of a person.

In the embodiments of the present disclosure, a type of the base station is not limited. The base station may be a Macro Base Station, a Pico Base Station, a Node B (a name of a 3G mobile base station), an enhanced base station (Enhanced Node B, ENB), a home enhanced base station (Femto eNB or Home eNode B or Home eNB or HNEB), a relay station, an access point, a Remote Radio Unit (RRU), a Remote Radio Head (RRH), and so on.

Figure 6:
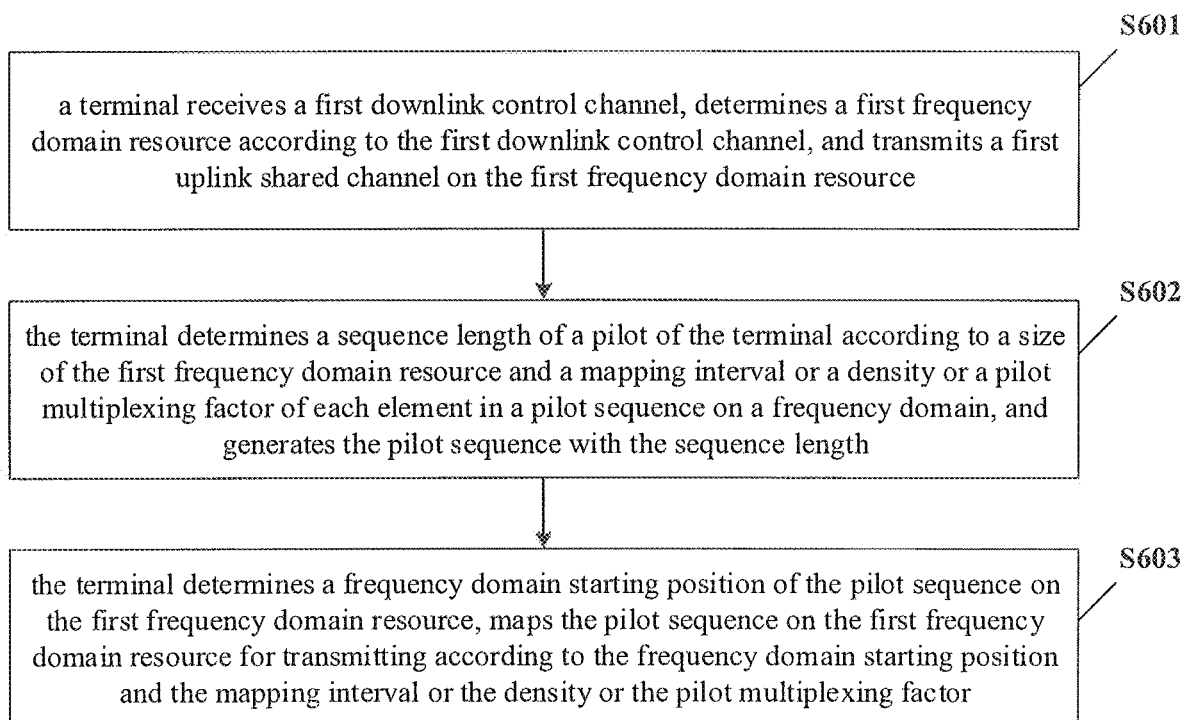
FIG. 6 is a flowchart illustrating a transmission method according to embodiments of the present disclosure.
Figure 7A:
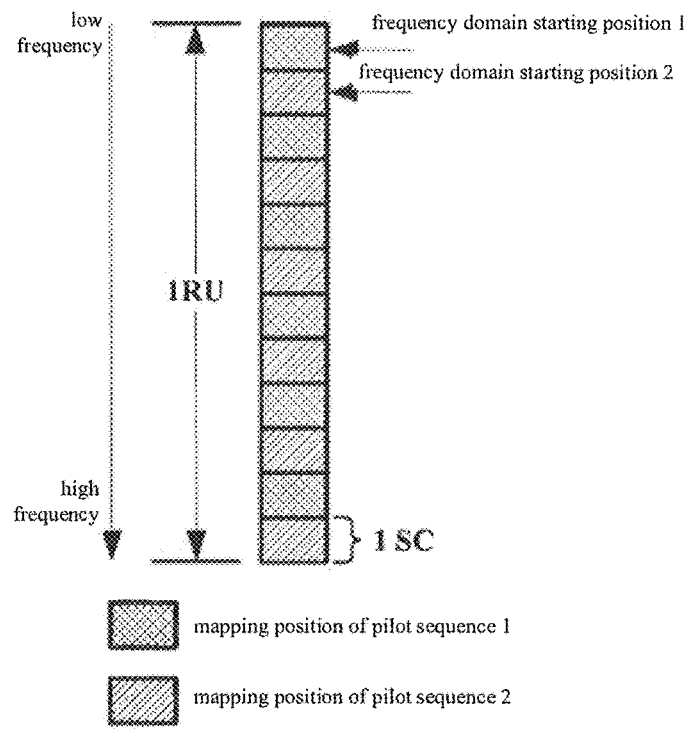
FIGS. 7A-7D are schematic diagrams respectively illustrating a comb mapping manner when a mapping interval or a density or a multiplexing factor of the pilot is 2, 3, 4, and 6 according to embodiments of the present disclosure.
Figure 7B:
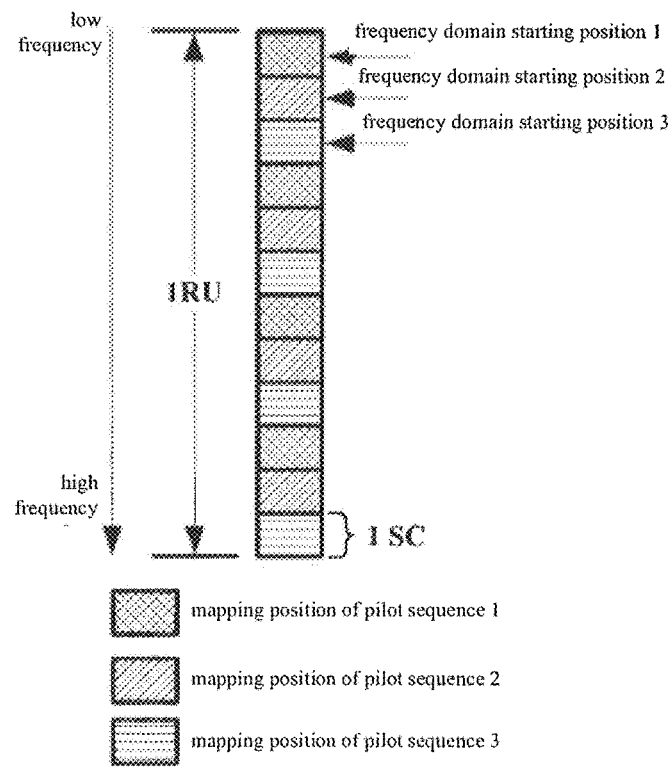
Figure 7C:
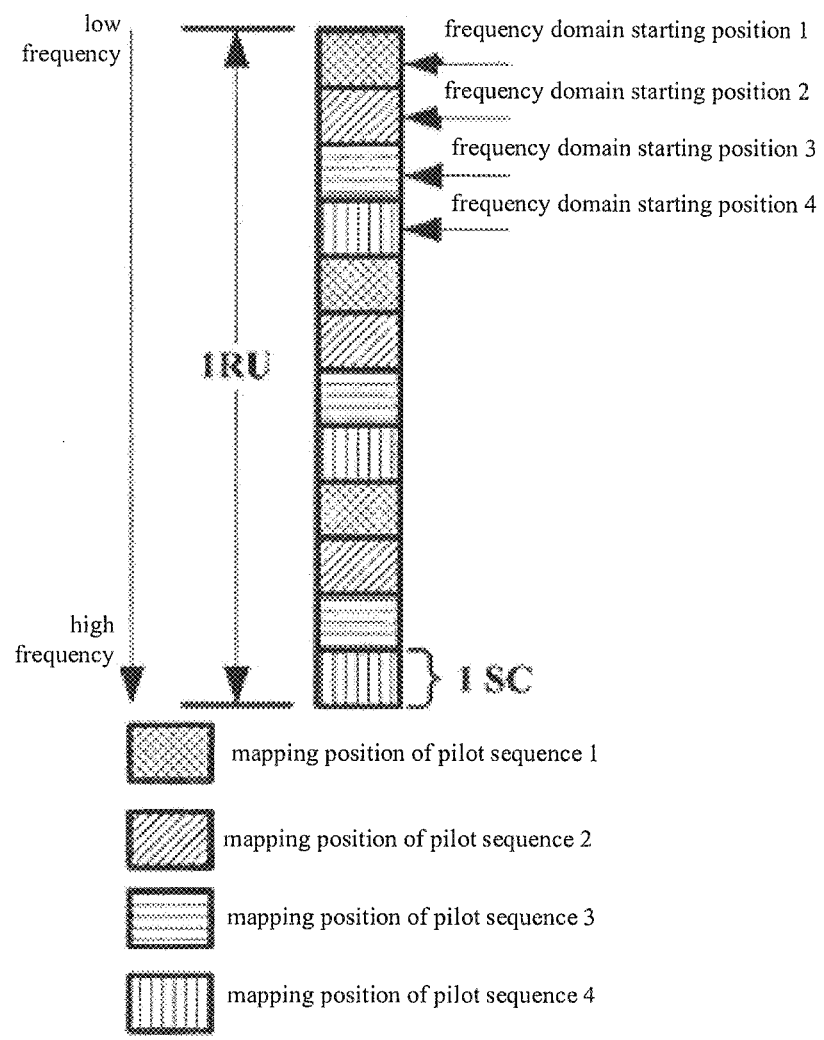
Figure 7D:
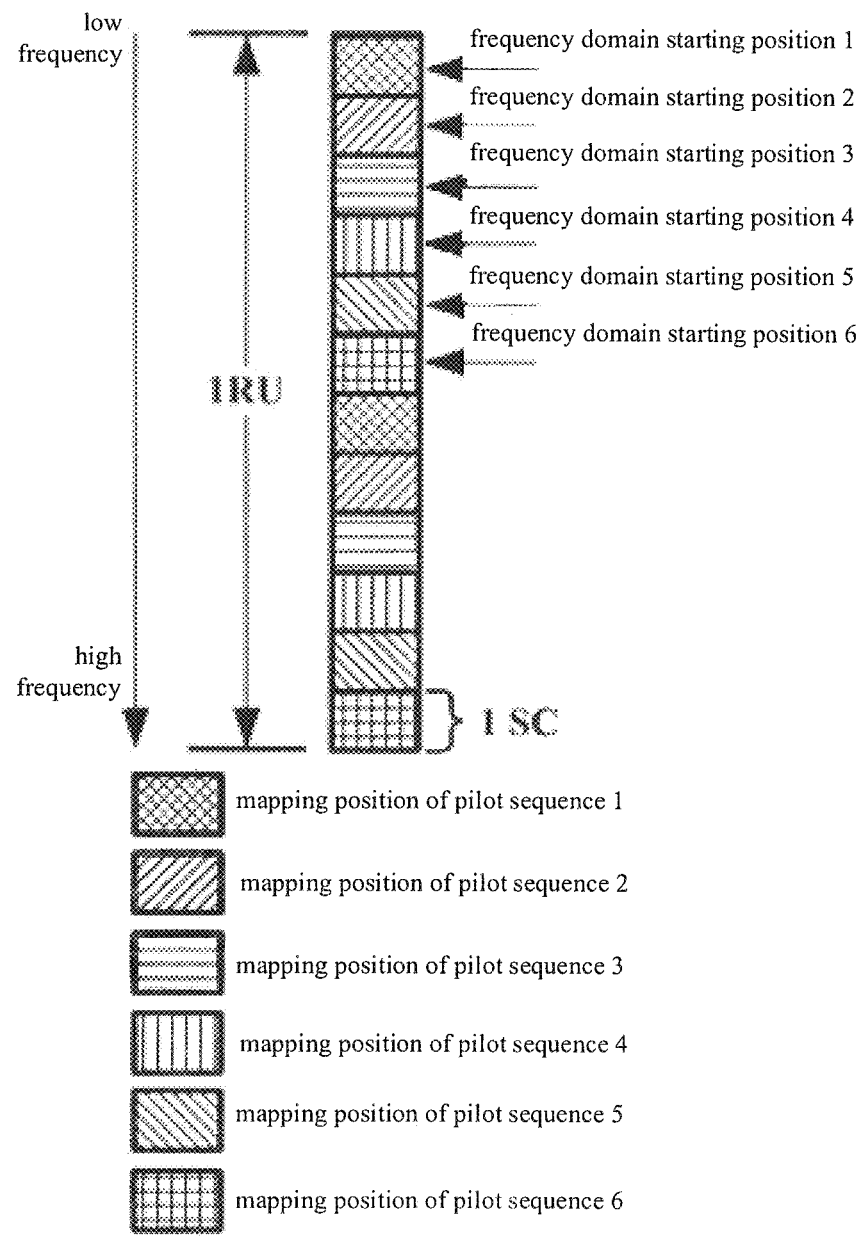

FIG. 6 is a flowchart illustrating a transmission method according to embodiments of the present disclosure. The method includes operations as follows.

At block S601, a terminal receives a first downlink control channel, determines a first frequency domain resource according to the first downlink control channel, and transmits a first uplink shared channel on the first frequency domain resource.

Optionally, in the embodiment, the first downlink control channel carries an uplink scheduling grant of the first uplink shared channel.

Optionally, in the embodiment, a TTI length of the first downlink control channel and/or the first uplink shared channel is less than or equal to 1 ms.

At block S602, the terminal determines a sequence length of a pilot of the terminal according to a size of the first frequency domain resource and a mapping interval or a density or a pilot multiplexing factor of each element in a pilot sequence on a frequency domain, and generates the pilot sequence with the sequence length.

Optionally, in the embodiment, the sequence length of the pilot is equal to (the number of subcarriers included in the first frequency domain resource)/K, in which K is the mapping interval, or the density, or the pilot multiplexing factor.

Optionally, in the embodiment, the pilot multiplexing factor is the number of different pilot sequences that may be simultaneously transmitted by frequency division multiplexing in a same frequency domain resource area.

Optionally, in the embodiment, the mapping interval or the density or the pilot multiplexing factor is pre-determined or informed through configuration signaling.

Specifically, the mapping interval or the density or the pilot multiplexing factor is a divisor of the number of subcarriers included in a basic unit of frequency domain transmission, in which the basic unit of the frequency domain transmission may be pre-defined as M Physical Resource Blocks (PRB) or subcarriers (SC) or resource units in the frequency domain, in which M is a pre-defined or pre-configured positive integer not less than 1. The resource unit may be defined as a subcarrier on a symbol (i.e., a Single Carrier Frequency Division Multiple Access (SC-FDMA) symbol), i.e., an RE (a subcarrier on a frequency and a symbol on the time domain are called an RE), or may be defined as consecutive X2 RE/SCs in the frequency domain on a symbol, which is referred to as Resource Unit (RU). The basic unit of the frequency domain transmission is the smallest unit of frequency domain scheduling. That is, frequency domain resources occupied by one data transmission are an integer multiple of the basic unit of the frequency domain transmission.

For example, assuming that the basic unit of the frequency domain transmission is twelve subcarriers or one PRB or one RU (in which one RU is assumed to be twelve consecutive subcarriers in the frequency domain on a symbol), the mapping interval or the density or the pilot multiplexing factor may be one of one, two, three, four, and six subcarriers, or other values. For example, when the mapping interval or the density or the pilot multiplexing factor is two subcarriers, it means that there is one pilot resource in every two subcarriers, and two different pilot sequences may be frequency-division multiplexed in the same frequency domain resource area, in which the mapping interval may be an interval with the same relative frequency domain position of different subcarriers as a reference point. For example, the length between subcarrier 1 and subcarrier 2, starting from the lower edge of subcarrier 1 to the lower edge of subcarrier 2, is 1 subcarrier. Alternatively, the length between subcarrier 1 and subcarrier 2, starting from the upper edge of subcarrier 1 to the upper edge of subcarrier 2, is 1 subcarrier.

High-level signaling such as Radio Resource Control (RRC), Media Access Control (MAC), System Information Block (SIB), Master Information Block (MIB), etc., pre-configures a value in a pre-defined set of the mapping interval or the density or the pilot multiplexing factor. Alternatively, the first downlink control channel notifies the value in the pre-defined set of the mapping interval or the density or the pilot multiplexing factor.

At block S603, the terminal determines a frequency domain starting position of the pilot sequence on the first frequency domain resource, maps the pilot sequence on the first frequency domain resource for transmitting according to the frequency domain starting position and the mapping interval or the density or the pilot multiplexing factor.

In the embodiment, the frequency domain starting position $k_{TC}$ belongs to a set $\{0, 1, \ldots, K-1\}$ or $\{1, 2, \ldots, K\}$ including K different frequency domain starting position elements, in which K is the value of the mapping interval or the density or the pilot multiplexing factor.

Optionally, the frequency domain starting position is determined according to a pre-determined rule or is notified through configuration signaling.

According to optional mode 1, the frequency domain starting position is determined according to the pre-determined rule, which includes following operations.

A correspondence between each basic TTI divided based on a basic TTI length in a subframe and a frequency domain starting position of pilot transmission of each basic TTI is predetermined.

In this case, the basic TTI length is a minimum TTI length allowed for once data transmission. Every data transmission may occupy integer multiple of the basic TTI, and does not exceed a boundary of a subframe.

When a data transmission occupies more than one basic TTI length, it is determined that a frequency domain starting position of a pilot of the data transmission is a frequency domain starting position of pilot transmission corresponding to one basic TTI of a basic TTI set occupied by the data transmission. For example, the frequency domain starting position of the pilot transmission of the data transmission is always determined based on the first basic TTI included in the data transmission.

According to optional mode 2, the frequency domain starting position is determined according to the configuration signaling, which includes following operations.

The high-level signaling, such as RRC, MAC, SIB, MIB, etc., pre-configures the frequency domain starting position, or the first downlink control channel notifies the frequency domain starting position.

Frequency domain starting positions corresponding to multiple first uplink shared channels transmitting the pilot on the same frequency domain resource on the same symbol are different. That is, pilots of different first uplink shared channels are transmitted in the same frequency domain area (e.g., the same PRB or the same basic unit of the frequency domain transmission or the same RU) through frequency division multiplexing. That is, the pilots of the different first uplink shared channels are mapped on different subcarriers in the same frequency domain area. Alternatively, the frequency domain starting positions corresponding to the multiple first uplink shared channels transmitting the pilot on the same frequency domain resource on the same symbol are identical and cyclic shifts of the pilot or orthogonality sequences of the pilot corresponding to the multiple first uplink shared channels are different. That is, the pilots of the different first uplink shared channels are transmitted in the same frequency domain area (e.g., the same PRB or the same basic unit of the frequency domain transmission or the same RU) through code division multiplexing. That is, the pilots of the different first uplink shared channels are mapped on the same subcarrier, and multiple pilot sequences mapped on the same resources are orthogonalized through different cyclic shifts or orthogonal sequence spread spectrums. In this way, pilots of different first uplink shared channels may be distinguished through orthogonal characteristics. At this time, it is required that the pilot sequences of the different first uplink shared channels have the same length, the mapped resources are identical, and pilot base sequences are identical when cyclic shift is used. Alternatively, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different. That is, the above-mentioned multiple first uplink shared channels are divided into two groups. The pilots of the first uplink shared channels in the first group are transmitted in the same frequency domain area (e.g., the same PRB or the same basic unit of the frequency domain transmission or the same RU) through the frequency division multiplexing. That is, the pilots of the different first uplink shared channels in the first group are mapped on different subcarriers in the same frequency domain area. The pilots of the first uplink shared channels in the second group are transmitted in the same frequency domain area (e.g., the same PRB or the same basic unit of the frequency domain transmission or the same RU) through the code division multiplexing. That is, the pilots of the different first uplink shared channels in the second group are mapped on the same subcarrier, and multiple pilot sequences mapped on the same resources are orthogonalized through different cyclic shifts or orthogonal sequence spread spectrums. In this way, pilots of different first uplink shared channels may be distinguished through orthogonal characteristics. At this time, it is required that the pilot sequences of the different first uplink shared channels have the same length, the mapped resources are identical, and pilot base sequences are identical when cyclic shift is used. This mode can support simultaneous transmission of pilots of more first uplink shared channels in the same frequency domain area by multiplexing transmission.

The size of the first frequency domain resource is an integer multiple of the basic unit of the frequency domain transmission; and/or the first frequency domain resource is indicated taking the basic unit of the frequency domain transmission as a unit (i.e., the first frequency domain resource is N basic units of the frequency domain transmission in the system).

FIGS. 7A-7D are schematic diagrams respectively illustrating a comb mapping manner when a mapping interval or a density or a multiplexing factor of a pilot is 2, 3, 4, and 6 according to embodiments of the present disclosure. Taking the mapping of the pilot in one RU as an example, when there are multiple RUs, each RU is mapped in the same manner. In this case, a RU is assumed to be twelve consecutive subcarriers (SC) in the frequency domain. The size of other RUs and a pilot mapping manner of another mapping interval or density or multiplexing factor are similar as those describe above, which are not repeated herein.

Assuming that a mapping interval or a density or a multiplexing factor of a pilot in a system is pre-determined as 3, that is, K=3. There are three frequency domain starting positions $k_{TC}$ which are values in a set $\{0, 1, 2\}$. In this case, three different data transmissions may multiplexly transmit pilots (DMRS) of the data transmissions in a same frequency domain resource area. Taking notifying a frequency domain starting position of pilot mapping of each data transmission through scheduling information of each data transmission (i.e., the first downlink control channel) as an example, assuming that 2 bits in DCI used by the first downlink control channel indicate the frequency domain starting position, a correspondence between an indication field and indication contents is shown in Table 2.

It should be noted that when the correspondence in the table is exchanged, or the number of indication bits is changed, or the value of the indicated frequency domain starting position is changed, other corresponding methods are similar to the above-described method, which are included in the present disclosure. Two bits are taken as an example herein. When the value of the mapping interval or the density or the multiplexing factor of the pilot that are determined or configured in the system is larger, more bits are needed. However, the indication manners are similar, which are not repeated herein.

TABLE 2 a correspondence between an indication field of two bits in the DCI and indication contents

| Status of the DCI indication field | The indicated frequency domain starting position or value of $k_{TC}$ |
|---|---|
| 00 | frequency domain starting position 1 or $k_{TC}$ = 0 |
| 01 | frequency domain starting position 2 or $k_{TC}$ = 1 |
| 10 | frequency domain starting position 3 or $k_{TC}$ = 2 |
| 11 | Reserved |

For example, when the length of TTI transmission is 4 symbols, it is assumed that system uplink bandwidth is 20 MHz, and includes 100 PRBs, i.e., subcarriers are numbered from 0 to 1199, or RUs are numbered from 0 to 99 (taking the RU as a unit, assuming that each RU includes 12 SCs, defining from the smallest SC side, and starting with RU0, the following is similar).

Figure 8:
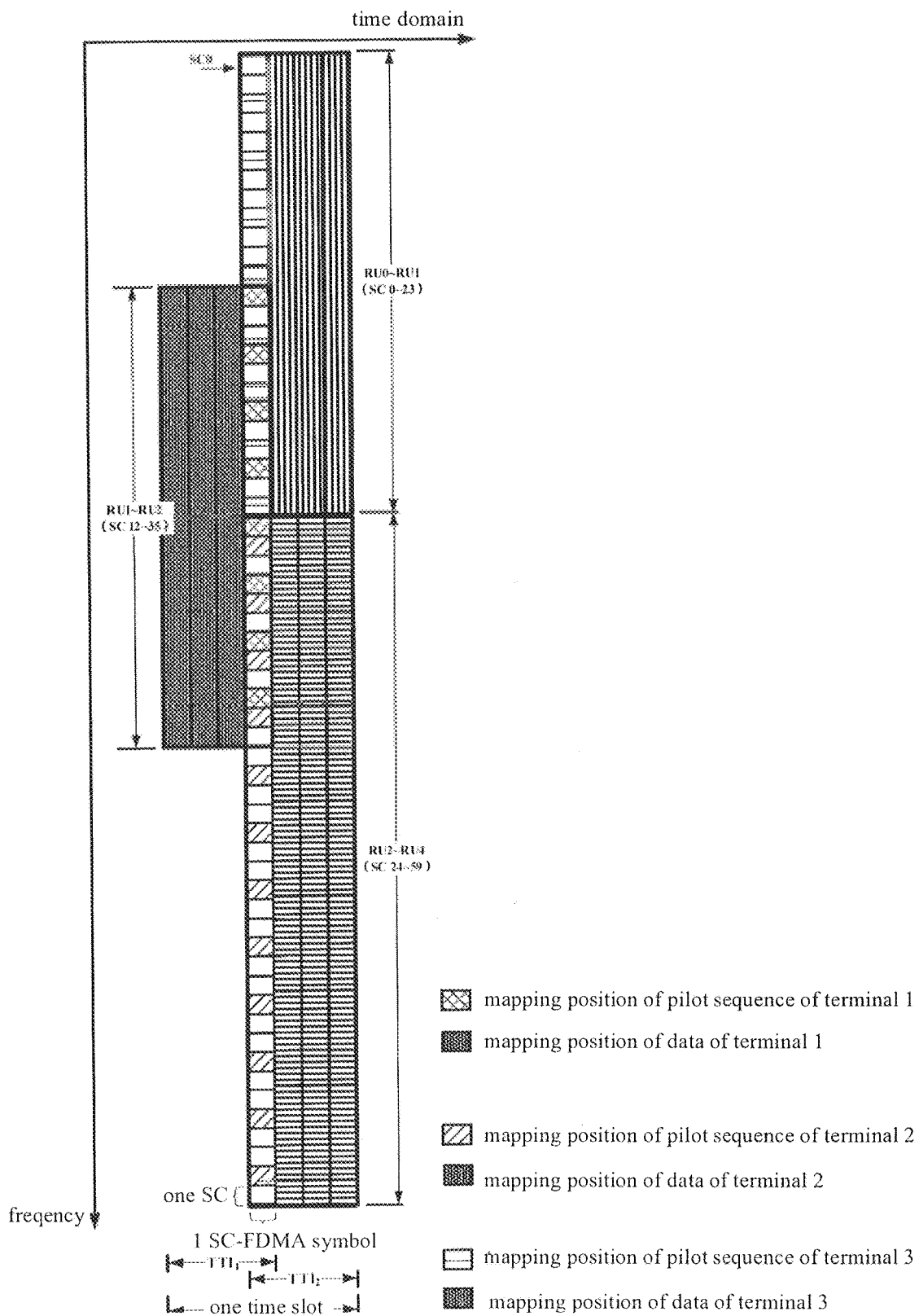
FIG. 8 is a schematic diagram illustrating pilot mapping according to embodiments of the present disclosure.

Referring to FIG. 8, frequency domain resources (i.e., the first frequency domain resources, the following is similar) occupied by data transmission indicated by scheduling signaling of terminal 1 are subcarriers 12~35 or RU1~RU2. According to K=3 and the size of the scheduled frequency domain resources, the length of a pilot sequence of terminal 1 is determined as 2×12/3=8. The pilot sequence of length 8 is generated. According to a frequency domain starting position of a pilot indicated by scheduling information, assuming it is "00", it is determined that the frequency domain starting position of the pilot of terminal 1 is frequency domain starting position 1 or $k_{TC}$=0. Then, in each RU of the allocated frequency domain resources, i.e., RU1~RU2, pilot mapping is performed in such a manner that one pilot modulation symbol is mapped every three SCs starting from frequency domain starting position 1 (i.e., one pilot modulation symbol exists in every three consecutive SCs).

Continuing to refer to FIG. 8, frequency domain resources occupied by data transmission scheduled by scheduling signaling of terminal 2 are subcarriers 24~59 or RU2~RU2. According to K=3 and the size of the scheduled frequency domain resources, the length of a pilot sequence of terminal 2 is determined as 3×12/3=12. The pilot sequence of length 12 is generated. According to a frequency domain starting position of a pilot indicated by scheduling information, assuming it is "01", it is determined that the frequency domain starting position of the pilot of terminal 2 is frequency domain starting position 2 or $k_{TC}$=1. Then, in each RU of the allocated frequency domain resources, i.e., RU2~RU4, pilot mapping is performed in such a manner that one pilot modulation symbol is mapped every three SCs starting from frequency domain starting position 2 (i.e., one pilot modulation symbol exists in every three consecutive SCs).

Continuing to refer to FIG. 8, frequency domain resources occupied by data transmission scheduled by scheduling signaling of terminal 3 are subcarriers 0~23or RU0~RU1. According to K=3 and the size of the scheduled frequency domain resources, the length of a pilot sequence of terminal 3 is determined as 2×12/3=8. The pilot sequence of length 8 is generated. According to a frequency domain starting position of a pilot indicated by scheduling information, assuming it is "10", it is determined that the frequency domain starting position of the pilot of terminal 3 is frequency domain starting position 3 or $k_{TC}$=2. Then, in each RU of the allocated frequency domain resources, i.e., RU0~RU1, pilot mapping is performed in such a manner that one pilot modulation symbol is mapped every three SCs starting from frequency domain starting position 3 (i.e., one pilot modulation symbol exists in every three consecutive SCs).

It should be noted that, in the above embodiments, the mapping interval or the density or the multiplexing factor of the pilot may also be configured by signaling, such as high-level signaling or first control channel configuration. Terminal 1, terminal 2, and terminal 3 may be the same terminal. That is, the above three data transmissions correspond to different three data transmissions of the same terminal.

Further, in order to improve pilot multiplexing capacity on the same frequency domain resources, based on the foregoing method, a cyclic shift value or an orthogonal sequence of the pilot may further be configured through signaling (e.g., the cyclic shift value of the pilot is determined according to cyclic shift configuration information in the first downlink control channel) for multiple data transmissions or TTIs (i.e., pilots) which have the same frequency domain starting position. In this way, pilots corresponding different data transmissions and transmitted on the same subcarrier may be orthogonalized. At this time, in order to ensure the orthogonality between cyclic shifts corresponding to different data transmissions or the orthogonality of the pilots after orthogonal spread spectrum, the lengths of the pilot sequences are the same.

Figure 9:
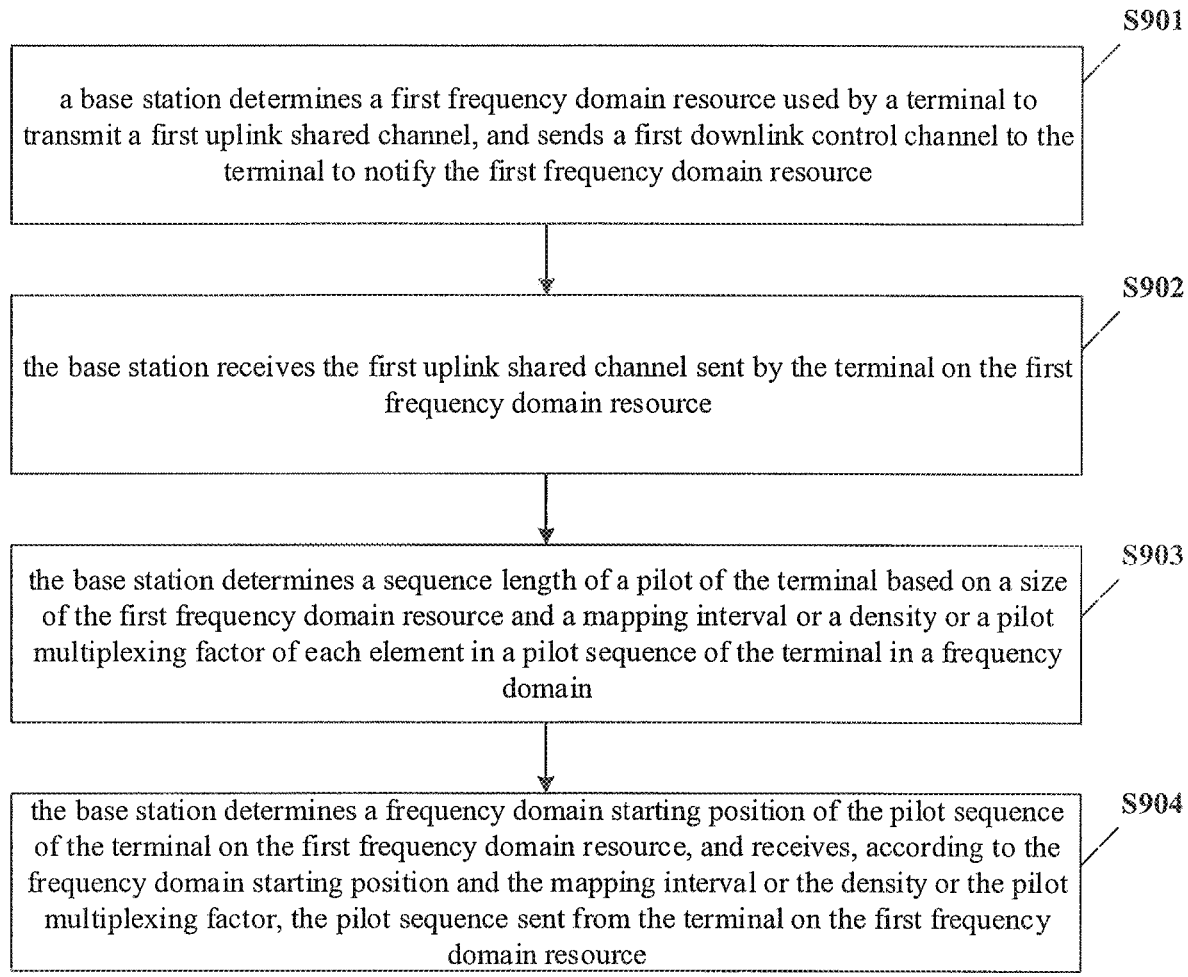
FIG. 9 is a flowchart illustrating a transmission method according to embodiments of the present disclosure.

FIG. 9 is a flowchart illustrating a transmission method according to embodiments of the present disclosure. The method includes operations as follows.

At block S901, a base station determines a first frequency domain resource used by a terminal to transmit a first uplink shared channel, and sends a first downlink control channel to the terminal to notify the first frequency domain resource.

Optionally, in the embodiment, the first downlink control channel carries an uplink scheduling grant of the first uplink shared channel.

Optionally, in the embodiment, a TTI length of the first downlink control channel and/or the first uplink shared channel is less than or equal to 1 ms.

At block S902, the base station receives the first uplink shared channel sent by the terminal on the first frequency domain resource.

At block S903, the base station determines a sequence length of a pilot of the terminal based on a size of the first frequency domain resource and a mapping interval or a density or a pilot multiplexing factor of each element in a pilot sequence of the terminal in a frequency domain.

Optionally, in the embodiment, the sequence length of the pilot is equal to (the number of subcarriers included in the first frequency domain resource)/K, in which K is the mapping interval, or the density, or the pilot multiplexing factor.

Optionally, in the embodiment, the pilot multiplexing factor is the number of different pilot sequences that may be simultaneously transmitted by frequency division multiplexing in a same frequency domain resource area.

Optionally, in the embodiment, the mapping interval or the density or the pilot multiplexing factor is pre-determined or informed through configuration signaling.

Specifically, the mapping interval or the density or the pilot multiplexing factor is a divisor of the number of subcarriers included in a basic unit of frequency domain transmission, in which the basic unit of the frequency domain transmission may be pre-defined as M Physical Resource Blocks (PRB) or subcarriers (SC) or resource units in the frequency domain, in which M is a pre-defined or pre-configured positive integer not less than 1. The resource unit may be defined as a subcarrier on a symbol (i.e., a Single Carrier Frequency Division Multiple Access (SC-FDMA) symbol), i.e., a Resource Element (a subcarrier on a frequency and a symbol on the time domain are called an RE), or may be defined as consecutive X2 RE/SCs in the frequency domain on a symbol, which is referred to as Resource Unit (RU). The basic unit of the frequency domain transmission is the smallest unit of frequency domain scheduling. That is, frequency domain resources occupied by one data transmission are an integer multiple of the basic unit of the frequency domain transmission.

For example, assuming that the basic unit of the frequency domain transmission is twelve subcarriers or one PRB or one RU (in which one RU is assumed to be twelve consecutive subcarriers in the frequency domain on a symbol), the mapping interval or the density or the pilot multiplexing factor may be one of one, two, three, four, and six subcarriers, or other values. For example, when the mapping interval or the density or the pilot multiplexing factor is two subcarriers, it means that there is one pilot resource in every two subcarriers, and two different pilot sequences may be frequency-division multiplexed in the same frequency domain resource area, in which the mapping interval may be an interval with the same relative frequency domain position of different subcarriers as a reference point. For example, the length between subcarrier 1 and subcarrier 2, starting from the lower edge of subcarrier 1 to the lower edge of subcarrier 2, is 1 subcarrier. Alternatively, the length between subcarrier 1 and subcarrier 2, starting from the upper edge of subcarrier 1 to the upper edge of subcarrier 2, is 1 subcarrier.

High-level signaling such as Radio Resource Control (RRC), Media Access Control (MAC), System Information Block (SIB), Master Information Block (MIB), etc., pre-configures a value in a pre-defined set of the mapping interval or the density or the pilot multiplexing factor. Alternatively, the first downlink control channel notifies the value in the pre-defined set of the mapping interval or the density or the pilot multiplexing factor.

At block S904, the base station determines a frequency domain starting position of the pilot sequence of the terminal on the first frequency domain resource, and receives, according to the frequency domain starting position and the mapping interval or the density or the pilot multiplexing factor, the pilot sequence sent from the terminal on the first frequency domain resource.

In the embodiment, the frequency domain starting position $k_{TC}$ belongs to a set $\{0, 1, \ldots, K-1\}$ or $\{1, 2, \ldots, K\}$ including K different frequency domain starting position elements, in which K is the value of the mapping interval or the density or the pilot multiplexing factor.

Optionally, the frequency domain starting position is determined according to a pre-determined rule or is notified through configuration signaling.

According to optional mode 1, the frequency domain starting position is determined according to the pre-determined rule, which includes following operations.

A correspondence between each basic TTI divided based on a basic TTI length in a subframe and a frequency domain starting position of pilot transmission of each basic TTI is predetermined.

In this case, the basic TTI length is a minimum TTI length allowed for once data transmission. Every data transmission may occupy integer multiple of the basic TTI, and does not exceed a boundary of a subframe.

When a data transmission occupies more than one basic TTI length, it is determined that a frequency domain starting position of a pilot of the data transmission is a frequency domain starting position of pilot transmission corresponding to one basic TTI of a basic TTI set occupied by the data transmission. For example, the frequency domain starting position of the pilot transmission of the data transmission is always determined based on the first basic TTI included in the data transmission.

According to optional mode 2, the frequency domain starting position is determined according to the configuration signaling, which includes following operations.

The high-level signaling, such as RRC, MAC, SIB, MIB, etc., pre-configures the frequency domain starting position, or the first downlink control channel notifies the frequency domain starting position.

Frequency domain starting positions corresponding to multiple first uplink shared channels transmitting the pilot on the same frequency domain resource on the same symbol are different. That is, pilots of different first uplink shared channels are transmitted in the same frequency domain area (e.g., the same PRB or the same basic unit of the frequency domain transmission or the same RU) through frequency division multiplexing. That is, the pilots of the different first uplink shared channels are mapped on different subcarriers in the same frequency domain area. Alternatively, the frequency domain starting positions corresponding to the multiple first uplink shared channels transmitting the pilot on the same frequency domain resource on the same symbol are identical and cyclic shifts of the pilot or orthogonality sequences of the pilot corresponding to the multiple first uplink shared channels are different. That is, the pilots of the different first uplink shared channels are transmitted in the same frequency domain area (e.g., the same PRB or the same basic unit of the frequency domain transmission or the same RU) through code division multiplexing. That is, the pilots of the different first uplink shared channels are mapped on the same subcarrier, and multiple pilot sequences mapped on the same resources are orthogonalized through different cyclic shifts or orthogonal sequence spread spectrums. In this way, pilots of different first uplink shared channels may be distinguished through orthogonal characteristics. At this time, it is required that the pilot sequences of the different first uplink shared channels have the same length, the mapped resources are identical, and pilot base sequences are identical when cyclic shift is used. Alternatively, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different. That is, the above-mentioned multiple first uplink shared channels are divided into two groups. The pilots of the first uplink shared channels in the first group are transmitted in the same frequency domain area (e.g., the same PRB or the same basic unit of the frequency domain transmission or the same RU) through the frequency division multiplexing. That is, the pilots of the different first uplink shared channels in the first group are mapped on different subcarriers in the same frequency domain area. The pilots of the first uplink shared channels in the second group are transmitted in the same frequency domain area (e.g., the same PRB or the same basic unit of the frequency domain transmission or the same RU) through the code division multiplexing. That is, the pilots of the different first uplink shared channels in the second group are mapped on the same subcarrier, and multiple pilot sequences mapped on the same resources are orthogonalized through different cyclic shifts or orthogonal sequence spread spectrums. In this way, pilots of different first uplink shared channels may be distinguished through orthogonal characteristics. At this time, it is required that the pilot sequences of the different first uplink shared channels have the same length, the mapped resources are identical, and pilot base sequences are identical when cyclic shift is used. This mode can support simultaneous transmission of pilots of more first uplink shared channels in the same frequency domain area by multiplexing transmission The size of the first frequency domain resource is an integer multiple of the basic unit of the frequency domain transmission; and/or the first frequency domain resource is indicated taking the basic unit of the frequency domain transmission as a unit (i.e., the first frequency domain resource is N basic units of the frequency domain transmission in the system).

It should be noted that other contents of embodiments of the base station side are the same as those of the embodiments of the terminal side, which are not repeated herein.

In this embodiment, when different TTIs share the same symbol position for transmitting the DMRS, the different TTIs adopt combo structure on the same DMRS symbol position to occupy different subcarriers for transmitting the DMRS of each of the TTIs. The DMRS of each of the TTIs is transmitted according to scheduled frequency domain resources, thus the DMRSs of the different TTIs are transmitted on the same symbol by frequency division multiplexing. As such, frequency division multiplexing transmission of pilot sequences of multiple data transmissions in the same resource area may be achieved through the comb structure. Thus, when the transmission bandwidth changes, it is ensured that frequency domain resources of the data transmission are different but DMRSs of multiple terminals sharing DMRS resources may be distinguished. In this way, uplink data may be correctly transmitted and demodulated. And, when multiple TTIs share a DMRS time domain position, the TTIs do not interfere with each other.

Figure 10:
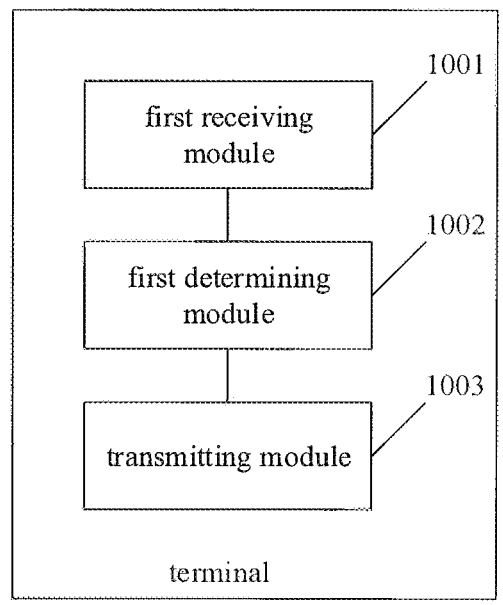
FIG. 10 is a first schematic diagram illustrating a terminal according to embodiments of the present disclosure.

FIG. 10 is a schematic diagram illustrating a terminal according to embodiments of the present disclosure. The terminal includes:

a first receiving module 1001, configured to receive a first downlink control channel, determine a first frequency domain resource according to the first downlink control channel, and transmit a first uplink shared channel on the first frequency domain resource;

a first determining module 1002, configured to determine a sequence length of a pilot of the terminal according to a size of the first frequency domain resource and a mapping interval or a density or a pilot multiplexing factor of each element in a pilot sequence on a frequency domain, and generate the pilot sequence with the sequence length; and a transmitting module 1003, configured to determine a frequency domain starting position of the pilot sequence on the first frequency domain resource, map the pilot sequence on the first frequency domain resource for transmitting according to the frequency domain starting position and the mapping interval or the density or the pilot multiplexing factor.

Optionally, the first downlink control channel carries an uplink scheduling grant of the first uplink shared channel. And/or, a TTI length of the first downlink control channel and/or the first uplink shared channel is less than or equal to 1 ms.

Optionally, the sequence length of the pilot is equal to (the number of subcarriers included in the first frequency domain resource)/K, in which K is the mapping interval, or the density, or the pilot multiplexing factor.

Optionally, the mapping interval or the density or the pilot multiplexing factor is pre-determined or informed through configuration signaling. In this case, the configuration signaling may be high-level signaling or an indication field in the first downlink control channel.

Optionally, the mapping interval or the density or the pilot multiplexing factor is a divisor of the number of subcarriers included in a basic unit of frequency domain transmission, in which the basic unit of the frequency domain transmission may be pre-defined as M PRBs or subcarriers or resource units in the frequency domain, in which M is a pre-defined or pre-configured positive integer not less than 1. The resource unit may be defined as a subcarrier on a symbol or consecutive X2 subcarriers in the frequency domain on a symbol.

Optionally, the frequency domain starting position $k_{TC}$ belongs to a set $\{0, 1, \ldots, K-1\}$ or $\{1, 2, \ldots, K\}$ including K different frequency domain starting position elements, in which K is the value of the mapping interval or the density or the pilot multiplexing factor.

Optionally, the frequency domain starting position is determined according to a pre-determined rule or is notified through configuration signaling.

Optionally, the frequency domain starting position is determined according to the pre-determined rule, which includes following operations.

A correspondence between each basic TTI divided based on a basic TTI length in a subframe and a frequency domain starting position of pilot transmission of each basic TTI is predetermined. In this case, the basic TTI length is a minimum TTI length allowed for once data transmission. Every data transmission may occupy integer multiple of the basic TTI, and does not exceed a boundary of a subframe. When a data transmission occupies more than one basic TTI length, it is determined that a frequency domain starting position of a pilot of the data transmission is a frequency domain starting position of pilot transmission corresponding to one basic TTI of a basic TTI set occupied by the data transmission.

The frequency domain starting position is determined according to the configuration signaling, which includes following operations.

The high-level signaling pre-configures the frequency domain starting position, or the first downlink control channel notifies the frequency domain starting position.

Optionally, frequency domain starting positions corresponding to multiple first uplink shared channels transmitting the pilot on the same frequency domain resource on the same symbol are different. Alternatively, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different. Alternatively, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

Optionally, the size of the first frequency domain resource is an integer multiple of the basic unit of the frequency domain transmission; and/or, the first frequency domain resource is indicated taking the basic unit of the frequency domain transmission as a unit.

In the embodiment, the above-described terminal may be the terminal in the embodiments shown in FIGS. 6-8. Any implementation manner of the terminal in the embodiments shown in FIGS. 6-8 may be implemented by the terminal in this embodiment, which is not repeated herein.

Figure 11:
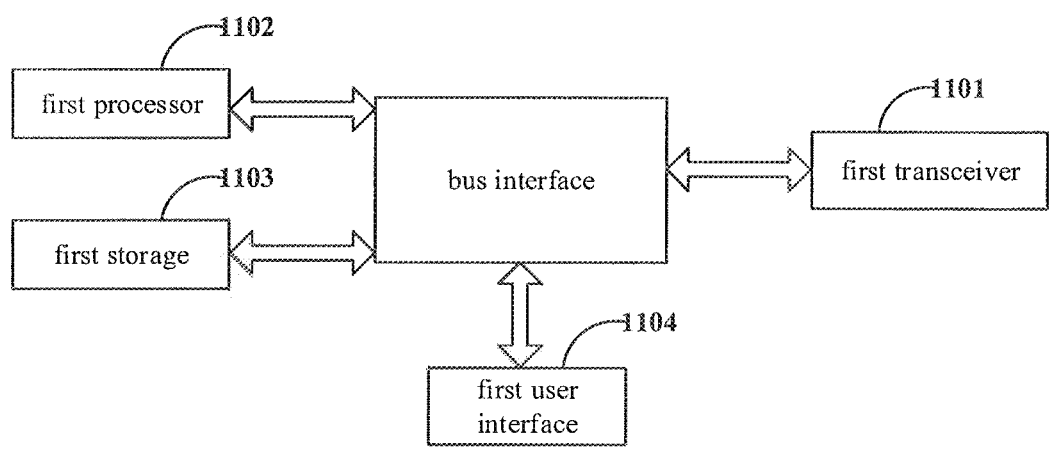
FIG. 11 is a second schematic diagram illustrating a terminal according to embodiments of the present disclosure.

FIG. 11 is a schematic diagram illustrating a terminal according to embodiments of the present disclosure. The terminal includes:

a first transceiver 1101, configured to receive a first downlink control channel, determine a first frequency domain resource according to the first downlink control channel, transmit a first uplink shared channel on the first frequency domain resource, and map a pilot sequence on the first frequency domain resource for transmitting according to a frequency domain starting position and a mapping interval or a density or a pilot multiplexing factor; and a first processor 1102, configured to determine a sequence length of a pilot of the terminal according to a size of the first frequency domain resource and a mapping interval or a density or a pilot multiplexing factor of each element in the pilot sequence on a frequency domain, generate the pilot sequence with the sequence length, and determine a frequency domain starting position of the pilot sequence on the first frequency domain resource.

In FIG. 11, the bus architecture may include any number of interconnected buses and bridges, which may specifically be linked by various circuits of one or more processors represented by the first processor 1102 and a storage represented by a first storage 1103. The bus architecture also links various other circuits such as peripherals, voltage regulators, and power management circuits. A bus interface provides an interface. The first transceiver 1101 may be a plurality of components including a transmitter and a receiver, providing units for communicating with various other devices on a transmission medium. For different user devices, a first user interface 1104 may be an interface capable of externally or internally connecting a required device. The connected device may include but not be limited to a little keypad, a display, a speaker, a microphone, a joystick, and the like.

In the embodiment, the above-described terminal may be the terminal in the embodiments shown in FIGS. 6-8. Any implementation manner of the terminal in the embodiments shown in FIGS. 6-8 may be implemented by the terminal in this embodiment, which is not repeated herein.

Figure 12:
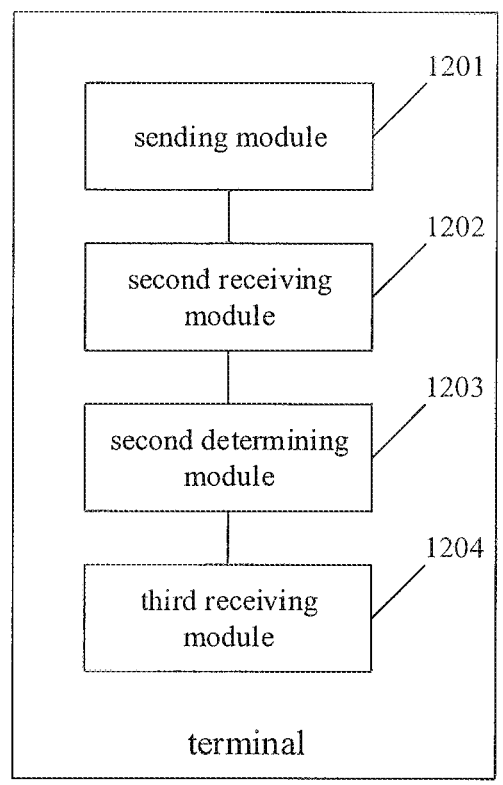
FIG. 12 is a first schematic diagram illustrating a base station according to embodiments of the present disclosure.

FIG. 12 is a schematic diagram illustrating a base station according to embodiments of the present disclosure. The base station includes:

a sending module 1201, configured to determine a first frequency domain resource used by a terminal to transmit a first uplink shared channel, and send a first downlink control channel to the terminal to notify the first frequency domain resource;

a second receiving module 1202, configured to receive, on the first frequency domain resource, the first uplink shared channel sent by the terminal;

a second determining module 1203, configured to determine a sequence length of a pilot of the terminal based on a size of the first frequency domain resource and a mapping interval or a density or a pilot multiplexing factor of each element in a pilot sequence of the terminal on a frequency domain; and a third receiving module 1204, configured to determine a frequency domain starting position of the pilot sequence of the terminal on the first frequency domain resource, and receive, according to the frequency domain starting position and the mapping interval or the density or the pilot multiplexing factor, the pilot sequence sent from the terminal on the first frequency domain resource.

Optionally, the first downlink control channel carries an uplink scheduling grant of the first uplink shared channel. A TTI length of the first downlink control channel and/or the first uplink shared channel is less than or equal to 1 ms.

Optionally, the sequence length of the pilot is equal to (the number of subcarriers included in the first frequency domain resource)/K, in which K is the mapping interval, or the density, or the pilot multiplexing factor.

Optionally, the mapping interval or the density or the pilot multiplexing factor is pre-determined or informed through configuration signaling. In this case, the configuration signaling may be high-level signaling or an indication field in the first downlink control channel.

Optionally, the mapping interval or the density or the pilot multiplexing factor is a divisor of the number of subcarriers included in a basic unit of frequency domain transmission, in which the basic unit of the frequency domain transmission may be pre-defined as M PRBs or subcarriers or resource units in the frequency domain, in which M is a pre-defined or pre-configured positive integer not less than 1. The resource unit may be defined as a subcarrier on a symbol or consecutive X2 subcarriers in the frequency domain on a symbol.

Optionally, the frequency domain starting position $k_{TC}$ belongs to a set $\{0, 1, \ldots, K-1\}$ or $\{1, 2, \ldots, K\}$ including K different frequency domain starting position elements, in which K is the value of the mapping interval or the density or the pilot multiplexing factor.

Optionally, the frequency domain starting position is determined according to a pre-determined rule or is notified through configuration signaling.

Optionally, the frequency domain starting position is determined according to the pre-determined rule, which includes following operations.

A correspondence between each basic TTI divided based on a basic TTI length in a subframe and a frequency domain starting position of pilot transmission of each basic TTI is predetermined. In this case, the basic TTI length is a minimum TTI length allowed for once data transmission. Every data transmission may occupy integer multiple of the basic TTI, and does not exceed a boundary of a subframe.

When a data transmission occupies more than one basic TTI length, it is determined that a frequency domain starting position of a pilot of the data transmission is a frequency domain starting position of pilot transmission corresponding to one basic TTI of a basic TTI set occupied by the data transmission.

The frequency domain starting position is determined according to the configuration signaling, which includes following operations.

The high-level signaling pre-configures the frequency domain starting position, or the first downlink control channel notifies the frequency domain starting position.

Optionally, frequency domain starting positions corresponding to multiple first uplink shared channels transmitting the pilot on the same frequency domain resource on the same symbol are different. Alternatively, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different. Alternatively, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

Optionally, the size of the first frequency domain resource is an integer multiple of the basic unit of the frequency domain transmission; and/or, the first frequency domain resource is indicated taking the basic unit of the frequency domain transmission as a unit.

In the embodiment, the above-described base station may be the base station in the embodiment shown in FIG. 9. Any implementation manner of the base station in the embodiment shown in FIG. 9 may be implemented by the base station in this embodiment, which is not repeated herein.

Figure 13:
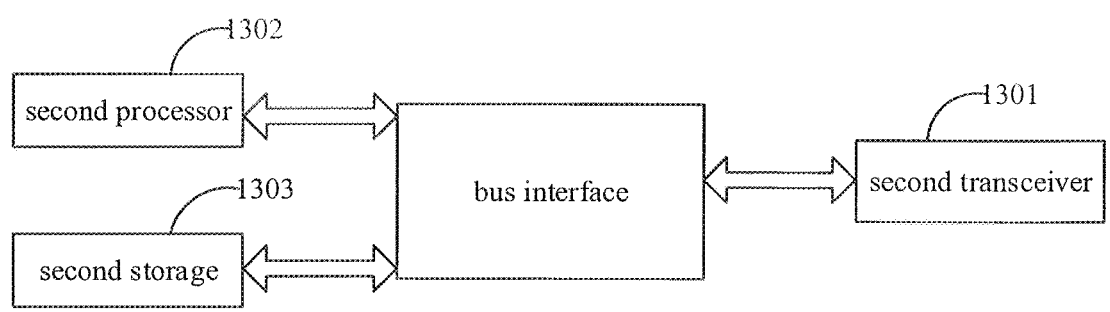
FIG. 13 is a second schematic diagram illustrating a base station according to embodiments of the present disclosure.

FIG. 13 is a schematic diagram illustrating a base station according to embodiments of the present disclosure. The base station includes:

a second transceiver 1301, configured to send a first downlink control channel to a terminal to notify a first frequency domain resource, receive, on the first frequency domain resource, a first uplink shared channel sent by the terminal, and receive, according to a frequency domain starting position and a mapping interval or a density or a pilot multiplexing factor, a pilot sequence sent from the terminal on the first frequency domain resource; and a second processor 1302, configured to determine the first frequency domain resource used by the terminal to transmit the first uplink shared channel, determine a sequence length of a pilot of the terminal based on a size of the first frequency domain resource and a mapping interval or a density or a pilot multiplexing factor of each element in the pilot sequence of the terminal on a frequency domain, and determine a frequency domain starting position of the pilot sequence of the terminal on the first frequency domain resource.

In FIG. 13, the bus architecture may include any number of interconnected buses and bridges, which may specifically be linked by various circuits of one or more processors represented by the second processor 1302 and a storage represented by a second storage 1303. The bus architecture also links various other circuits such as peripherals, voltage regulators, and power management circuits. A bus interface provides an interface. The second transceiver 1301 may be a plurality of components including a transmitter and a receiver, providing units for communicating with various other devices on a transmission medium.

Optionally, the first downlink control channel carries an uplink scheduling grant of the first uplink shared channel. A TTI length of the first downlink control channel and/or the first uplink shared channel is less than or equal to 1 ms.

Optionally, the sequence length of the pilot is equal to (the number of subcarriers included in the first frequency domain resource)/K, in which K is the mapping interval, or the density, or the pilot multiplexing factor.

Optionally, the mapping interval or the density or the pilot multiplexing factor is pre-determined or informed through configuration signaling. In this case, the configuration signaling may be high-level signaling or an indication field in the first downlink control channel.

Optionally, the mapping interval or the density or the pilot multiplexing factor is a divisor of the number of subcarriers included in a basic unit of frequency domain transmission, in which the basic unit of the frequency domain transmission may be pre-defined as M PRBs or subcarriers or resource units in the frequency domain, in which M is a pre-defined or pre-configured positive integer not less than 1. The resource unit may be defined as a subcarrier on a symbol or consecutive X2 subcarriers in the frequency domain on a symbol.

Optionally, the frequency domain starting position $k_{TC}$ belongs to a set $\{0, 1, \ldots, K-1\}$ or $\{1, 2, \ldots, K\}$ including K different frequency domain starting position elements, in which K is the value of the mapping interval or the density or the pilot multiplexing factor.

Optionally, the frequency domain starting position is determined according to a pre-determined rule or is notified through configuration signaling.

Optionally, the frequency domain starting position is determined according to the pre-determined rule, which includes following operations.

A correspondence between each basic TTI divided based on a basic TTI length in a subframe and a frequency domain starting position of pilot transmission of each basic TTI is predetermined. In this case, the basic TTI length is a minimum TTI length allowed for once data transmission. Every data transmission may occupy integer multiple of the basic TTI, and does not exceed a boundary of a subframe. When a data transmission occupies more than one basic TTI length, it is determined that a frequency domain starting position of a pilot of the data transmission is a frequency domain starting position of pilot transmission corresponding to one basic TTI of a basic TTI set occupied by the data transmission.

The frequency domain starting position is determined according to the configuration signaling, which includes following operations.

The high-level signaling pre-configures the frequency domain starting position, or the first downlink control channel notifies the frequency domain starting position.

Optionally, frequency domain starting positions corresponding to multiple first uplink shared channels transmitting the pilot on the same frequency domain resource on the same symbol are different. Alternatively, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different. Alternatively, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

Optionally, the size of the first frequency domain resource is an integer multiple of the basic unit of the frequency domain transmission; and/or, the first frequency domain resource is indicated taking the basic unit of the frequency domain transmission as a unit.

In the embodiment, the above-described base station may be the base station in the embodiment shown in FIG. 9. Any implementation manner of the base station in the embodiment shown in FIG. 9 may be implemented by the base station in this embodiment, which is not repeated herein.

Figure 14:
FIG. 14 is a schematic diagram illustrating a transmission system according to embodiments of the present disclosure.

FIG. 14 is a schematic diagram illustrating a transmission system according to embodiments of the present disclosure. The transmission system includes a terminal 1401 and a base station 1402.

The terminal 1401 is configured to receive a first downlink control channel, determine a first frequency domain resource according to the first downlink control channel, and transmit a first uplink shared channel on the first frequency domain resource.

The terminal 1401 is further configured to determine a sequence length of a pilot of the terminal according to a size of the first frequency domain resource and a mapping interval or a density or a pilot multiplexing factor of each element in a pilot sequence on a frequency domain, and generate the pilot sequence with the sequence length.

The terminal 1401 is further configured to determine a frequency domain starting position of the pilot sequence on the first frequency domain resource, map the pilot sequence on the first frequency domain resource for transmitting according to the frequency domain starting position and the mapping interval or the density or the pilot multiplexing factor.

The base station 1402 is configured to determine a first frequency domain resource used by a terminal to transmit a first uplink shared channel, and send a first downlink control channel to the terminal to notify the first frequency domain resource.

The base station 1402 is further configured to receive, on the first frequency domain resource, the first uplink shared channel sent by the terminal.

The base station 1402 is further configured to determine a sequence length of a pilot of the terminal based on a size of the first frequency domain resource and a mapping interval or a density or a pilot multiplexing factor of each element in a pilot sequence of the terminal on a frequency domain.

The base station 1402 is further configured to determine a frequency domain starting position of the pilot sequence of the terminal on the first frequency domain resource, and receive, according to the frequency domain starting position and the mapping interval or the density or the pilot multiplexing factor, the pilot sequence sent from the terminal on the first frequency domain resource.

In the embodiment, the terminal 1401 and the base station 1402 may be the terminal and the base station described in the embodiments shown in FIGS. 6-13. Any implementation manner of the terminal and the base station described in the embodiments shown in FIGS. 6-13 may be implemented by the terminal and the base station in this embodiment, which is not repeated herein.

It should be understood that, "an embodiment" mentioned throughout the specification means as follows. A specific feature, structure or characteristic related with the embodiment is included by at least one embodiment of the present disclosure. Thus, "in an embodiment" throughout the whole specification does not necessarily refer to the same embodiment. In addition, these specific features, structures or characteristics may be combined into one or more embodiments in any appropriate manner.

In various embodiments of the present disclosure, it should be understood that, number sequence of each foregoing process does not mean order of execution. The order of execution of each process should be determined by function and internal logic thereof, instead of making any limitation to implementation process of embodiments in the present disclosure.

In addition, terms "system" and "network" in the present disclosure may be exchanged for use.

It should be understood that, the term "and/or" in the present disclosure only describes a relation of an associated object, which denotes that three relationships may exist, e.g., A and/or B may demonstrate three scenes of: A exists independently, A and B exist simultaneously, B exists independently. In addition, the character "/" in the present disclosure generally refers to that, there is a "or" relationship between two adjacent associated objects.

In the embodiments provided by the present disclosure, it should be understood that, "B corresponds to A" refers to as follows. B is related with A, and B may be determined based on A. It should also be understood that, determining B based on A does not mean to determine B only based on A, B may be determined based on A and/or other information.

In several embodiments provided by the present disclosure, it should be understood that, the disclosed method and device may be implemented by other modes. For example, the above described device embodiments are merely schematic, e.g., the division of units is only a logic function division. When being implemented in practice, there may be other division modes. For example, multiple units or components may be combined to, or integrated into another system, or some features may be omitted, or may be not executed. From another point, the displayed or discussed mutual coupling or direct coupling, or communication connection may be implemented, by using some interfaces, an indirect coupling or communication connection between devices or units, which may be electrical, mechanical or otherwise.

In addition, each functional unit in various embodiments of the present disclosure may be integrated into one processing unit, or each unit may be an independent physical entity, still or, at least two units may be integrated into one unit. Foregoing integrated unit may be implemented in the form of hardware, or in the form of hardware and software functional units.

Foregoing integrated unit, which is implemented in the form of software functional units, may be stored into a computer readable storage medium. Foregoing software functional unit is stored in one storage medium, which includes several instructions. The several instructions are capable of enabling one computer device (which may be a personal computer, a server, or a network device, and so on) to perform some blocks of a transceiver method in various embodiments of the present disclosure. While foregoing storage medium may be various mediums capable of storing program codes, which include U-disk, mobile hard disk, Read-Only Memory (ROM), Random Access Memory (RAM), disk, or Compact Disk (CD).

The foregoing is optional implementation modes of the present disclosure. It should be noted that, for persons having ordinary skill in the art, various improvements and retouches, which are made without departing from the principle of the present disclosure, should be covered by the present disclosure.

What is claimed is:

1. A transmission method, comprising:
    receiving, by a terminal, a first downlink control channel, determining a first frequency domain resource according to the first downlink control channel, and transmitting a first uplink shared channel on the first frequency domain resource;
    determining, by the terminal, a sequence length of a pilot of the terminal according to a size of the first frequency domain resource and a mapping interval or a density or a pilot multiplexing factor of each element in a pilot sequence on a frequency domain, and generating the pilot sequence with the sequence length; and
    determining, by the terminal, a frequency domain starting position of the pilot sequence on the first frequency domain resource, mapping the pilot sequence on the first frequency domain resource for transmitting according to the frequency domain starting position and the mapping interval or the density or the pilot multiplexing factor;
    wherein the method further comprises determining the frequency domain starting position according to a pre-determined rule or determining the frequency domain starting position according to a configuration signaling;
    wherein the determining the frequency domain starting position according to the pre-determined rule comprises:
    predetermining a correspondence between each basic TTI divided based on a basic TTI length in a subframe and a frequency domain starting position of pilot transmission of each basic TTI, wherein the basic TTI length is a minimum TTI length allowed for once data transmission, every data transmission occupies an integer multiple of the basic TTI and does not exceed a boundary of a subframe;
    when a data transmission occupies more than one basic TTI length, determining that a frequency domain starting position of a pilot of the data transmission is a frequency domain starting position of pilot transmission corresponding to one basic TTI of a basic TTI set occupied by the data transmission;
    wherein determining the frequency domain starting position according to a configuration signaling comprises:
    higher layer signaling pre-configuring the frequency domain starting position, or the first downlink control channel notifying the frequency domain starting position.

2. The method of claim 1, wherein the first downlink control channel carries an uplink scheduling grant of the first uplink shared channel; and/or,
    a Transmission Time Interval (TTI) length of the first downlink control channel and/or the first uplink shared channel is less than or equal to 1 ms.

3. The method of claim 1, wherein the sequence length of the pilot is equal to (the number of subcarriers comprised in the first frequency domain resource)/K, wherein K is the mapping interval, or the density, or the pilot multiplexing factor.

4. The method of claim 1, wherein the mapping interval or the density or the pilot multiplexing factor is pre-determined or informed through configuration signaling, wherein the configuration signaling is high-level signaling or an indication field in the first downlink control channel; and/or,
    wherein the mapping interval or the density or the pilot multiplexing factor is a divisor of the number of subcarriers comprised in a basic unit of frequency domain transmission, wherein the basic unit of the frequency domain transmission is pre-defined as M Physical Resource Blocks (PRB) or subcarriers or resource units in the frequency domain, wherein M is a pre-defined or pre-configured positive integer not less than 1, and the resource unit is defined as a subcarrier on a symbol or consecutive X2 subcarriers in the frequency domain on a symbol.

5. The method of claim 1, wherein the frequency domain starting position $k_{TC}$ belongs to a set $\{0, 1, \ldots, K-1\}$ or $\{1, 2, \ldots, K\}$ comprising K different frequency domain starting position elements, wherein K is a value of the mapping interval or the density or the pilot multiplexing factor.

6. The method of claim 1, wherein frequency domain starting positions corresponding to multiple first uplink shared channels transmitting the pilot on the same frequency domain resource on the same symbol are different;
    or,
    the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different;
    or,
    frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

7. The method of claim 1, wherein the size of the first frequency domain resource is an integer multiple of a basic unit of frequency domain transmission; and/or, the first frequency domain resource is indicated taking the basic unit of the frequency domain transmission as a unit.

8. A transmission method, comprising:
    determining, by a base station, a first frequency domain resource used by a terminal to transmit a first uplink shared channel, and sending a first downlink control channel to the terminal to notify the first frequency domain resource;
    receiving, by the base station on the first frequency domain resource, the first uplink shared channel sent by the terminal;
    determining, by the base station, a sequence length of a pilot of the terminal based on a size of the first frequency domain resource and a mapping interval or a density or a pilot multiplexing factor of each element in a pilot sequence of the terminal on a frequency domain; and determining, by the base station, a frequency domain starting position of the pilot sequence of the terminal on the first frequency domain resource, and receiving, according to the frequency domain starting position and the mapping interval or the density or the pilot multiplexing factor, the pilot sequence sent from the terminal on the first frequency domain resource;

wherein the method further comprises: determining the frequency domain starting position according to a pre-determined rule or determining the frequency domain starting position according to a configuration signaling;

wherein the determining the frequency domain starting position according to the pre-determined rule comprises:

predetermining a correspondence between each basic TTI divided based on a basic TTI length in a subframe and a frequency domain starting position of pilot transmission of each basic TTI, wherein the basic TTI length is a minimum TTI length allowed for once data transmission, every data transmission occupies an integer multiple of the basic TTI and does not exceed a boundary of a subframe;

when a data transmission occupies more than one basic TTI length, determining that a frequency domain starting position of a pilot of the data transmission is a frequency domain starting position of pilot transmission corresponding to one basic TTI of a basic TTI set occupied by the data transmission;

wherein the determining the frequency domain starting position according to a configuration signaling comprises:

higher layer signaling pre-configuring the frequency domain starting position, or the first downlink control channel notifying the frequency domain starting position.

9. The method of claim 8, wherein the first downlink control channel carries an uplink scheduling grant of the first uplink shared channel; and/or, a Transmission Time Interval (TTI) length of the first downlink control channel and/or the first uplink shared channel is less than or equal to 1 ms; and/or, wherein the sequence length of the pilot is equal to (the number of subcarriers comprised in the first frequency domain resource)/K, wherein K is the mapping interval, or the density, or the pilot multiplexing factor; and/or, wherein the mapping interval or the density or the pilot multiplexing factor is pre-determined or informed through configuration signaling, wherein the configuration signaling is high-level signaling or an indication field in the first downlink control channel; and/or, wherein the mapping interval or the density or the pilot multiplexing factor is a divisor of the number of subcarriers comprised in a basic unit of frequency domain transmission, wherein the basic unit of the frequency domain transmission is pre-defined as M Physical Resource Blocks (PRB) or subcarriers or resource units in the frequency domain, wherein M is a pre-defined or pre-configured positive integer not less than 1, and the resource unit is defined as a subcarrier on a symbol or consecutive X2 subcarriers in the frequency domain on a symbol; and/or, wherein the frequency domain starting position $k_{TC}$ belongs to a set $\{0, 1, \ldots, K-1\}$ or $\{1, 2, \ldots, K\}$ comprising K different frequency domain starting position elements, wherein K is a value of the mapping interval or the density or the pilot multiplexing factor; and/or, wherein the size of the first frequency domain resource is an integer multiple of a basic unit of frequency domain transmission; and/or, the first frequency domain resource is indicated taking the basic unit of the frequency domain transmission as a unit.

10. The method of claim 8, wherein frequency domain starting positions corresponding to multiple first uplink shared channels transmitting the pilot on the same frequency domain resource on the same symbol are different; or, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different; or, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

11. A terminal, comprising:

a first transceiver, configured to receive a first downlink control channel, determine a first frequency domain resource according to the first downlink control channel, transmit a first uplink shared channel on the first frequency domain resource, and map a pilot sequence on the first frequency domain resource for transmitting according to a frequency domain starting position and a mapping interval or a density or a pilot multiplexing factor; and a first processor, configured to determine a sequence length of a pilot of the terminal according to a size of the first frequency domain resource and a mapping interval or a density or a pilot multiplexing factor of each element in the pilot sequence on a frequency domain, generate the pilot sequence with the sequence length, and determine a frequency domain starting position of the pilot sequence on the first frequency domain resource;

wherein the method further comprises: determining the frequency domain starting position according to a pre-determined rule or determining the frequency domain starting position according to a configuration signaling;

wherein the determining the frequency domain starting position according to the pre-determined rule comprises:

predetermining a correspondence between each basic TTI divided based on a basic TTI length in a subframe and a frequency domain starting position of pilot transmission of each basic TTI, wherein the basic TTI length is a minimum TTI length allowed for once data transmission, every data transmission occupies an integer multiple of the basic TTI and does not exceed a boundary of a subframe;

when a data transmission occupies more than one basic TTI length, determining that a frequency domain starting position of a pilot of the data transmission is a frequency domain starting position of pilot transmission corresponding to one basic TTI of a basic TTI set occupied by the data transmission;

wherein the determining the frequency domain starting position according to a configuration signaling comprises:

higher layer signaling pre-configuring the frequency domain starting position, or the first downlink control channel notifying the frequency domain starting position.

12. The terminal of claim 11, wherein the first downlink control channel carries an uplink scheduling grant of the first uplink shared channel; and/or, a Transmission Time Interval (TTI) length of the first downlink control channel and/or the first uplink shared channel is less than or equal to 1 ms; and/or, wherein the sequence length of the pilot is equal to (the number of subcarriers comprised in the first frequency domain resource)/K, wherein K is the mapping interval, or the density, or the pilot multiplexing factor; and/or, wherein the mapping interval or the density or the pilot multiplexing factor is pre-determined or informed through configuration signaling, wherein the configuration signaling is high-level signaling or an indication field in the first downlink control channel; and/or, wherein the mapping interval or the density or the pilot multiplexing factor is a divisor of the number of subcarriers comprised in a basic unit of frequency domain transmission, wherein the basic unit of the frequency domain transmission is pre-defined as M Physical Resource Blocks (PRB) or subcarriers or resource units in the frequency domain, wherein M is a pre-defined or pre-configured positive integer not less than 1, and the resource unit is defined as a subcarrier on a symbol or consecutive X2 subcarriers in the frequency domain on a symbol; and/or, wherein the frequency domain starting position $k_{TC}$ belongs to a set $\{0, 1, \ldots, K-1\}$ or $\{1, 2, \ldots, K\}$ comprising K different frequency domain starting position elements, wherein K is a value of the mapping interval or the density or the pilot multiplexing factor; and/or, wherein the size of the first frequency domain resource is an integer multiple of a basic unit of frequency domain transmission; and/or, the first frequency domain resource is indicated taking the basic unit of the frequency domain transmission as a unit.

13. The terminal of claim 11, wherein frequency domain starting positions corresponding to multiple first uplink shared channels transmitting the pilot on the same frequency domain resource on the same symbol are different; or, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different; or, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

14. A base station, comprising:

a second transceiver, configured to send a first downlink control channel to a terminal to notify a first frequency domain resource, receive, on the first frequency domain resource, a first uplink shared channel sent by the terminal, and receive, according to a frequency domain starting position and a mapping interval or a density or a pilot multiplexing factor, a pilot sequence sent from the terminal on the first frequency domain resource; and a second processor, configured to determine the first frequency domain resource used by the terminal to transmit the first uplink shared channel, determine a sequence length of a pilot of the terminal based on a size of the first frequency domain resource and a mapping interval or a density or a pilot multiplexing factor of each element in the pilot sequence of the terminal on a frequency domain, and determine a frequency domain starting position of the pilot sequence of the terminal on the first frequency domain resource;

wherein the method further comprises: determining the frequency domain starting position according to a pre-determined rule or determining the frequency domain starting position according to a configuration signaling;

wherein the determining the frequency domain starting position according to the pre-determined rule comprises:

predetermining a correspondence between each basic TTI divided based on a basic TTI length in a subframe and a frequency domain starting position of pilot transmission of each basic TTI, wherein the basic TTI length is a minimum TTI length allowed for once data transmission, every data transmission occupies an integer multiple of the basic TTI and does not exceed a boundary of a subframe;

when a data transmission occupies more than one basic TTI length, determining that a frequency domain starting position of a pilot of the data transmission is a frequency domain starting position of pilot transmission corresponding to one basic TTI of a basic TTI set occupied by the data transmission;

wherein the determining the frequency domain starting position according to a configuration signaling comprises:

higher layer signaling pre-configuring the frequency domain starting position, or the first downlink control channel notifying the frequency domain starting position.

15. The base station of claim 14, wherein the first downlink control channel carries an uplink scheduling grant of the first uplink shared channel; and/or, a Transmission Time Interval (TTI) length of the first downlink control channel and/or the first uplink shared channel is less than or equal to 1 ms; and/or, wherein the sequence length of the pilot is equal to (the number of subcarriers comprised in the first frequency domain resource)/K, wherein K is the mapping interval, or the density, or the pilot multiplexing factor; and/or, wherein the mapping interval or the density or the pilot multiplexing factor is pre-determined or informed through configuration signaling, wherein the configuration signaling is high-level signaling or an indication field in the first downlink control channel; and/or, wherein the mapping interval or the density or the pilot multiplexing factor is a divisor of the number of subcarriers comprised in a basic unit of frequency domain transmission, wherein the basic unit of the frequency domain transmission is pre-defined as M Physical Resource Blocks (PRB) or subcarriers or resource units in the frequency domain, wherein M is a pre-defined or pre-configured positive integer not less than 1, and the resource unit is defined as a subcarrier on a symbol or consecutive X2 subcarriers in the frequency domain on a symbol; and/or, wherein the frequency domain starting position $k_{TC}$ belongs to a set $\{0, 1, \ldots, K-1\}$ or $\{1, 2, \ldots, K\}$ comprising K different frequency domain starting position elements, wherein K is a value of the mapping interval or the density or the pilot multiplexing factor; and/or, wherein the size of the first frequency domain resource is an integer multiple of a basic unit of frequency domain transmission; and/or, the first frequency domain resource is indicated taking the basic unit of the frequency domain transmission as a unit.

16. The base station of claim 14, wherein frequency domain starting positions corresponding to multiple first uplink shared channels transmitting the pilot on the same frequency domain resource on the same symbol are different; or, the frequency domain starting positions corresponding to the multiple first uplink shared channels transmitting the pilot on the same frequency domain resource on the same symbol are identical, and cyclic shifts of the pilot or orthogonality sequences of the pilot corresponding to the multiple first uplink shared channels are different; or, frequency domain starting positions corresponding to a part of the multiple first uplink shared channels transmitting the pilot on the same frequency domain resource on the same symbol are different, frequency domain starting positions corresponding to remaining part of the multiple first uplink shared channels transmitting the pilot on the same frequency domain resource on the same symbol are identical, and cyclic shifts of the pilot or orthogonality sequences of the pilot corresponding to the remaining part of the multiple first uplink shared channels are different.

* * * * *